United States Patent [19]
Felthouse et al.

[11] Patent Number: 5,264,200
[45] Date of Patent: Nov. 23, 1993

[54] MONOLITHIC CATALYSTS FOR CONVERSION OF SULFUR DIOXIDE TO SULFUR TRIOXIDE

[75] Inventors: Timothy R. Felthouse; Atis Vavere, both of St. Louis, Mo.

[73] Assignee: Monsanto Company, St. Louis, Mo.

[21] Appl. No.: 915,129

[22] Filed: Jul. 14, 1992

Related U.S. Application Data

[60] Division of Ser. No. 615,307, Nov. 19, 1990, Pat. No. 5,175,136, which is a continuation-in-part of Ser. No. 531,003, May 31, 1990, abandoned.

[51] Int. Cl.$^5$ .................. C01B 17/69; C01B 17/74; B01J 35/04
[52] U.S. Cl. ..................... 423/522; 413/534; 413/535; 413/536; 502/22; 502/28; 502/514; 502/516
[58] Field of Search ............... 423/522, 533, 534, 535, 423/536, 537; 502/22, 28, 514, 516

[56] References Cited

U.S. PATENT DOCUMENTS

| | | | |
|---|---|---|---|
| 1,429,222 | 9/1922 | Briggs | 502/22 |
| 1,518,043 | 12/1924 | Audinwne | 423/534 |
| 1,683,694 | 9/1928 | Patrick et al. | 423/536 |
| 1,743,700 | 1/1930 | Allen | 423/537 |
| 1,789,460 | 1/1931 | Clark | 423/533 |
| 1,914,458 | 6/1933 | Perry | 423/537 |
| 1,935,188 | 11/1933 | Latshaw et al. | 522/262 |
| 1,941,426 | 12/1933 | Beardsley et al. | 423/234 |
| 1,965,963 | 7/1934 | Merrian | 423/534 |
| 1,980,829 | 11/1934 | Ridler | 502/22 |
| 2,005,412 | 6/1935 | Connolly et al. | 423/534 |
| 2,200,522 | 5/1940 | Streicher | 423/536 |
| 2,408,396 | 10/1946 | Horsley | 423/536 |
| 2,418,851 | 4/1947 | Rosenblatt et al. | 423/537 |
| 2,742,437 | 4/1956 | Houdry | 502/262 |
| 3,142,536 | 7/1964 | Guth et al. | 423/533 |
| 3,259,459 | 7/1966 | Mëller | 423/536 |
| 3,282,645 | 11/1966 | Mandelik | 423/534 |
| 3,448,061 | 6/1969 | Mika | 423/535 |
| 3,518,206 | 6/1970 | Sowards et al. | 502/244 |

(List continued on next page.)

FOREIGN PATENT DOCUMENTS

| | | |
|---|---|---|
| 3910249 | 10/1989 | Fed. Rep. of Germany . |
| 3911889 | 10/1989 | Fed. Rep. of Germany . |
| 1093836 | 5/1986 | Japan .................. 502/262 |
| 2081239 | 2/1982 | United Kingdom . |

OTHER PUBLICATIONS

H. J. Jung & E. R. Becker, Platinum Metals Rev., 1987, 31, (4), 162–170 entitled Emission Control for Gas Turbines (Platinum-Rhodium Catalysts for Carbon Monoxide and Hydrocarbon Removal).

H. Jensen-Holm & T. D. Kind, Oxidation of Sulphur Dioxide—New Catalyst Types, Sulfur 88: Proceedings of the International Conference, Vienna, Austria, 1988, pp. 75–84.

*Primary Examiner*—Gary P. Straub
*Attorney, Agent, or Firm*—Senniger, Powers, Leavitt & Roedel

[57] ABSTRACT

Chemically and thermally stable monolithic catalysts are disclosed having platinum or alkali metal-vanadium active phases for use in the conversion of sulfur dioxide to sulfur trioxide. The platinum catalyst comprises a foraminous ceramic support which has at its wall surfaces a high surface area substrate for an active catalyst phase, and a combination of a platinum active phase and a promoter on the substrate. The substrate preferably comprises silica, provided, for example, by application of a silica washcoat. The promoter is selected from among compounds of zirconium, hafnium and titanium.

The alkali-vanadium catalyst comprises a foraminous ceramic support having a porous silica substrate for the active phase at its foraminal wall surfaces. An alkali metal-vanadium active catalyst is in the pores of the porous silica.

Methods for producing the catalysts of the invention are described, as is a method for producing sulfur trioxide with the platinum catalyst, in which the catalyst is regenerated with a mineral acid when activity has declined through aging or exposure to the conditions of the oxidation of sulfur dioxide.

26 Claims, 6 Drawing Sheets

U.S. PATENT DOCUMENTS

| | | | |
|---|---|---|---|
| 3,544,929 | 1/1971 | Aarons | 502/322 |
| 3,653,828 | 4/1972 | Conner | 423/522 |
| 3,789,019 | 1/1974 | Stiles | 502/218 |
| 3,824,196 | 7/1974 | Benbow et al. | 502/507 |
| 3,963,423 | 6/1976 | Dorr et al. | 423/533 |
| 3,987,153 | 10/1976 | Stiles | 423/522 |
| 4,088,742 | 5/1978 | Humme, Jr. | 423/522 |
| 4,098,722 | 7/1978 | Cairns et al. | 502/527 |
| 4,193,894 | 3/1980 | Villadsen | 502/218 |
| 4,240,933 | 12/1980 | Copelin | 502/174 |
| 4,335,023 | 6/1982 | Dettling et al. | 502/262 |
| 4,431,573 | 2/1984 | Fennemann et al. | 502/218 |
| 4,539,309 | 9/1985 | Meissner et al. | 502/247 |
| 4,680,281 | 7/1987 | Fennemann | 502/218 |
| 4,744,967 | 5/1988 | Brand et al. | 423/239 |
| 4,766,104 | 8/1988 | Fennemann | 502/218 |
| 4,904,633 | 2/1990 | Ohata et al. | 502/304 |
| 5,127,960 | 7/1992 | Dittrich et al. | 134/21 |
| 5,151,391 | 9/1992 | Fu et al. | 502/516 |

500Å

100Å

MONOLITHIC CATALYSTS FOR CONVERSION OF SULFUR DIOXIDE TO SULFUR TRIOXIDE

CROSS REFERENCE TO RELATED APPLICATION

This is a division of application Ser. No. 07/615,307, filed Nov. 19, 1990, now U.S. Pat. No. 5,175,136 which is a continuation-in-part of Ser. No. 531,003, filed May 31, 1990 abandoned.

BACKGROUND OF THE INVENTION

This invention relates to the catalytic oxidation of sulfur dioxide to sulfur trioxide and to monolithic or honeycomb catalysts for the oxidation reaction. The invention particularly relates to improved monolithic catalysts and to sulfur acid manufacturing processes in which monolithic catalysts are used in preliminary contact stages and a particulate catalyst is used in the final stage.

Sulfuric acid is typically produced by catalytic gas phase oxidation of sulfur dioxide to sulfur trioxide [Eq. (1)]followed by hydration of the sulfur trioxide product to form sulfuric acid [Eq. (2)].

$$SO_2 + \tfrac{1}{2}O_2 \rightarrow SO_3 \quad (1)$$

$$SO_3 + H_2O \rightarrow H_2SO_4 \quad (2)$$

Eq. (1) proceeds at useful rates over solid particulate catalysts containing alkali-vanadium or platinum active phases. Typical gas concentrations of $SO_2$ at the inlet to the first pass of catalyst range from 4 to 13%. With adiabatic operation of each pass of the converter, four passes of catalyst are generally necessary to achieve overall $SO_2$ conversions in excess of 99.7%. Heat exchangers precede each pass in order to cool the gas stream to the desired inlet temperature to the catalyst bed. Conversions of at least 99.7% of the original $SO_2$ concentration are obtained through a double absorption design in which $SO_3$ is removed from the gas stream through acid irrigated absorption towers that follow the second [2:2 interpass absorption (IPA) design] or third (3:1 IPA design) pass of catalyst in the converter.

Various monolithic catalysts have been proposed for use in lieu of particulate catalysts in the contact process for the manufacture of sulfuric acid.

Monolithic catalysts are comprised of a ceramic honeycomb or other foraminous support having a high surface area substrate at the foraminal wall surfaces of the support, and a promoter and active catalyst phase on the substrate. Such high surface area substrate is provided, for example, by application of an alumina or silica washcoat to a honeycomb of mullite or the like. Alternatively, a mixture of high and low porosity silica powders is extruded to produce the honeycomb support, the high surface area silica providing the high surface area substrate at the surfaces of the foraminal walls of the honeycomb. This substrate generally exhibits both high surface area and high porosity. An active phase for the oxidation of sulfur dioxide is deposited on the substrate through adsorption of platinum from soluble precursor salts or impregnation of a porous substrate with soluble alkali and vanadium salts.

Platinum catalysts on both particulate and monolithic substrates have been suggested in the art for conversion of sulfur dioxide to sulfur trioxide. Platinum-containing active phases supported on particulates for the oxidation of $SO_2$ are well known. Examples of platinum supported on silica gels for the catalytic oxidation of sulfur dioxide are given, for example, in U.S. Pat. Nos. 1,683,694, 1,935,188, and 2,005,412. In these patents a platinum precursor salt is typically impregnated onto the particulate support then treated with a reducing gas such as hydrogen sulfide in order to "fix" the platinum active phase on the support prior to calcination. Promoter materials have been previously used with platinum on particulate catalysts. U.S. Pat. No. 2,005,412 uses promoter materials that include the elements aluminum, manganese, iron, nickel, copper, bismuth, molybdenum, beryllium, vanadium, tin, and chromium. U.S. Pat. No. 2,200,522 includes promoter species with the elements arsenic, vanadium, magnesium, chromium, and iron. U.S. Pat. No. 2,418,851 reports the use of palladium with platinum on a magnesium sulfate or aluminum oxide carrier.

The deposition of a high surface area washcoat onto a low surface area ceramic honeycomb substrate is described in U.S. Pat. Nos. 2,742,437 and 3,824,196. It is generally known in the art that monolithic catalysts can be used at gas velocities higher than those used with particulate catalysts (i.e., greater than 120 standard linear feet per minute, SLFM) as a consequence of higher geometric surface area per unit volume, higher concentration of the active phase near the catalyst surface to minimize mass and heat transfer to and from the gas phase, and much lower pressure drop per unit volume. Both oxidation rate and pressure drop constraints are less stringent for monolithic catalysts than for conventional particulate catalysts. the performance properties intrinsic to the monolithic structure are compared in detail to those of particulate catalysts by J. P. DeLuca and L. E. Campbell in "Advanced Materials in Catalysis," J. J. Burton and R. L. Garten, Eds., Acadenmic Press, N.Y., 1977, pages 312-318.

U.S. Pat. No. 3,518,206 describes the preparation of monolithic catalysts comprising a colloidal silica washcoat onto which is deposited active catalytic material selected from a group that includes elemental Pt. A variety of catalyst structures are described for a wide variety of applications, and numerous different active phase materials are described and exemplified. Examples in this patent described coating a 20 to 40 mesh $SO_2$ oxidation catalyst containing potassium, vanadium, iron, and silica on a honeycomb material through the use of colloidal silica (15%, 7 millimicron particle size). Another example describes dipping an aluminum honeycomb in a slurry of alumina and colloidal silica, and thereafter depositing platinum from chloroplatinic acid on the resultant alumina/silica coating. The catalyst so produced is said to be useful for oxidations of carbon monoxide to carbon dioxide, hydrogen to water, for the reduction of nitrogen oxides, and for various hydrogenation reactions.

U.S. Pat. No. 3,554,929 discloses preparation of monolithic catalysts with a high surface area coating derived from colloidal alumina. The monolith may be in the form of a honeycomb. Active catalysts, such as Pt, are deposited on the alumina coated support.

U.S. Pat. No. 4,098,722 describes a method for making a catalyst body from corrugated metal sheets of an aluminum-containing ferritic steel. An alumina washcoat carrier is applied to the catalyst body followed by deposition of an active catalytic material such as Pt.

U.S. Pat. No. 4,744,967 describes a process for exhaust gas purification that includes an oxidation catalyst for SO$_2$. An example discloses that the oxidation catalysts consist of honeycomb bodies with a cell density of 100 cells per square inch (cpsi) and an α-Al$_2$O$_3$ coating onto which finely distributed platinum is deposited at 70.8 grams of Pt per ft$^2$. Sulfuric acid of 77–80% strength is produced in a single step by passing an SO$_2$-containing gas over the catalyst at a space velocity of 7500/hr, 420°–460° C. inlet temperature, and 20 to 50 mg/m$^3$ dust after an electrofilter.

German Pat. DE 39 10 249 discloses a process for the production of a catalyst for the oxidation of sulfur dioxide gas that includes V$_2$O$_5$, a potassium salt, diatomaceous earth, and a sodium polyacrylate binder. Addition of water to this catalyst mixture allows it to be extruded to obtain a honeycomb-like form.

Meissner U.S. Pat. No. 4,539,309 describes catalysts for the oxidation of sulfur dioxide to sulfur trioxide that are prepared by dissolving vanadium pentoxidein an alkali solution, acidifying the solution with sulfuric acid, mixing the acidified solution with a carrier, molding or extruding the mixture, and drying and calcining the molding or extrudate. Working examples describe particulate extrudates having diameters of 6 mm.

Certain of the monolithic catalysts known to the prior art have been subject to thermal degradation, for example, by sintering of the active phase, at the temperatures of conversion of sulfur dioxide to sulfur trioxide. Initially highly active, they lose activity rapidly in commercial operation. Other catalysts provide a level of activity until contaminated by reaction byproducts or dusts contained in the reaction gases, but lack the chemical stability necessary for effective regeneration of the catalyst. Consequently, there has been an unfulfilled need in the art for monolithic catalysts which provide for high rates of conversion but are both thermally and chemically stable.

U.S. Pat. No. 3,259,459 describes a process for the production of SO$_3$ using either vanadium or platinum catalysts. The SO$_2$-containing gas stream is partially converted to SO$_3$ in the first pass, then the SO$_3$ is absorbed through an interpass absorption step. In the subsequent pass the converted SO$_2$-containing gas stream from which the SO$_3$ was removed is passed into the next catalyst bed at a temperature of at least 20° C. below that in the preceding pass. Interpass absorption is a common practice in the art, as further illustrated, for example, by the disclosures of U.S. Pat. Nos. 1,789,460, and 3,142,536.

U.S. Pat. No. 3,963,423 discloses a high gas throughput process for the conversion of SO$_2$ to SO$_3$. Each pass of catalyst contains at least three catalyst trays that are arranged either horizontally or vertically beside one another.

U.S. Pat. No. 3,987,153 describes an integrated process for the reduction of SO$_2$ emissions from a single absorption sulfuric acid plant consisting of multi-stage oxidation of SO$_2$. In at least the final pass, a cesium-containing particulate catalyst is loaded. Following absorption of the SO$_3$ from the gas stream, residual SO$_2$ is scrubbed by means of aqueous hydrogen peroxide and/or sulfur-containing peroxy acids.

UK Pat. Appl. GB 2,081,239 describes a catalytic oxidation process for producing SO$_3$ from SO$_2$ that uses monolithic catalyst. An SO$_2$- and O$_2$-containing gas stream is passed through the monolithic catalyst at a superficial gas velocity of at least 500 actual ft./min. The monolithic catalyst has an open cross-sectional area of at least 50% with open gas flow passages of at least 50 per square inch of cross-sectional area.

German Pat. DE 39 11 889 describes a contact process for the production of sulfuric acid that uses a catalyst arranged in one or more layers. The catalyst has several honeycomb-shaped openings with equivalent diameters between 3 and 15 mm and an open volume ratio between 40 and 70%. The catalyst is contained in a tube from which branch passages between the catalyst layers are located. These passages remove hot converted gases to heat exchangers after which the cooled gases are returned to the next catalyst layer in the tube.

In an effort to achieve economies of scale, sulfuric acid plants often are built with capacities of 2000 to 3000 short tons (ST)/day (as 100% H$_2$SO$_4$). The SO$_2$ gas composition is in the range of 10 to 11% by volume or higher. This rate of production leads to relatively large diameter (often 30 to 40 feet or more) reactor vessels containing catalyst loadings on the order of 30 to 50 liters/short ton (L/ST) (as 100% H$_2$SO$_4$) or more per pass. Current regulations on SO$_2$ emissions levels from sulfuric acid plants often require that 99.7% or more of the SO$_2$ fed to the first pass of the reactor be converted to SO$_3$. On the basis of the prior art, there is an unfilled need for a sulfuric acid process that gives high rates of H$_2$SO$_4$ production, affords significantly lower catalyst loadings in the upper passes, and at the same time, permits high levels of overall SO$_2$ conversion that equal or exceed 99.7% in a four-pass process.

SUMMARY OF THE INVENTION

Among the several objects of the present invention, therefore, are the provision of a novel monolithic catalyst for the oxidation of sulfur dioxide to sulfur trioxide; the provision of such a catalyst which operates at high gas velocity with relatively low pressure drop; the provision of such a catalyst which provides a high rate of conversion of sulfur dioxide to sulfur trioxide; the provision of such a catalyst which is resistant to active phase sintering and other forms of thermal degradation; the provision of such a catalyst which is chemically stable; the provision of such a catalyst which may be readily regenerated and reused; and the provision of methods for the preparation of such a catalyst.

It is a further object of this invention is to provide a general process for high rates of conversion of sulfur dioxide to sulfur trioxide over an economical number catalyst passes operated at higher gas velocity than conventional sulfuric acid plants. It is a particular object of the invention to provide such a process which may be implemented using a reactor vessel for several stages which is of small diameter in relation to those required for a conventional sulfuric acid process having a given production capacity.

Briefly, therefore, the present invention is directed to a monolithic catalyst for the conversion of sulfur dioxide to sulfur trioxide comprising a foraminous monolithic ceramic support. The support has at the foraminal wall surfaces thereof a high surface area substrate for an active catalyst phase. On the substrate is a combination of a platinum active phase and a promoter, the promoter being selected from the group consisting of a compound of zirconium, a compound of titanium or a compound of hafnium.

The invention is also directed to a monolithic catalyst generally of the aforesaid type in which the substrate comprises high surface area silica.

The invention is further directed to a monolithic catalyst for the conversion of sulfur dioxide to sulfur trioxide comprising a foraminous monolithic support having at the foraminal wall surfaces thereof a high porosity silica substrate for an active catalyst phase. An alkali metal-vanadium active phase is in the pores of the high porosity silica.

Further comprehended by the invention is a monolithic catalyst for the conversion of sulfur dioxide to sulfur trioxide comprising a foraminous monolithic ceramic support, a silica washcoat on the foraminal wall surfaces of the support, and a platinum active phase on the washcoat. The silica washcoat is bound to the foraminal wall surfaces of the support by a calcined silica sol.

Also included in the invention is a monolithic catalyst for the conversion of sulfur dioxide to sulfur trioxide comprising a foraminous monolithic ceramic support, the support having at the foraminal wall surfaces thereof a high surface area substrate for an active catalyst phase. On the substrate is a highly dispersed platinum active phase, the platinum active phase having been deposited on the substrate from a solution containing a precursor complex selected from among $Pt(NH_3)_4^{++}$ and $Pt(SO_3)_2OH^{3-}$.

The invention is further directed to a method for the preparation of a monolithic catalyst for the conversion of sulfur dioxide to sulfur trioxide. In accordance with the method, a washcoat slurry and a sol of a promoter are applied to the foraminal wall surfaces of a foraminous monolithic support that is permeable to high velocity flow of a gas containing sulfur dioxide and oxygen. The washcoat slurry comprises a high surface area silica in a sol, and the promoter comprises an oxide or silicate of zirconium, hafnium or titanium. The washcoat slurry and the promoter sol are dried to produce a green washcoat and a promoter on the surfaces of the foraminal walls. The green washcoat and promoter are calcined, thereby providing a substrate on the foraminal wall surfaces for an active catalyst phase. Platinum is deposited on the substrate.

Further contemplated by the invention is a process for the preparation of a monolithic catalyst comprising a foraminous support which has been produced by co-extrusion of a high surface area and a low surface area silica, the support being permeable to high velocity flow of a gas containing sulfur dioxide and oxygen. A sol of a promoter is applied to the foraminal wall surfaces of the support, the promoter comprising an oxide or silicate of a metal selected from among zirconium, hafnium and titanium. The promoter sol is dried to deposit a promoter on the surfaces of the foraminal walls of the support, and the promoter is calcined on such surfaces, thereby providing a substrate for a catalyst active phase. This substrate comprises the promoter and the high surface area silica. An active catalyst for the conversion of sulfur dioxide to sulfur trioxide is deposited on the substrate.

The invention is further directed to a process for the preparation of sulfur trioxide. In the process, a gas containing sulfur dioxide and oxygen is contacted with a monolithic catalyst for the oxidation of sulfur dioxide to sulfur trioxide. The catalyst comprises a foraminous monolithic ceramic support, the support having at its foraminal wall surfaces a high surface area silica substrate for an active catalyst phase and, on the substrate, an active phase selected from among platinum and alkali metal-vanadium. After a decline in the activity of said catalyst is incurred due to aging or exposure to the conditions of oxidation of sulfur dioxide to sulfur trioxide, the catalyst is contacted with a mineral acid to regenerate its activity, thereby producing a regenerated catalyst. Preparation of sulfur trioxide is resumed by contacting a gas containing sulfur dioxide and oxygen with the regenerated catalyst.

The invention is further directed to a process for the manufacture of sulfuric acid in which a gas stream comprising sulfur dioxide and oxygen is passed through a plurality of preliminary contacting stages, in each of which the gas is contacted with a monolithic catalyst comprising a platinum active phase, thereby converting a substantial fraction of the sulfur dioxide in the gas stream to sulfur trioxide. The gas stream leaving one of the plurality of preliminary contacting stages is contacted with sulfuric acid in an absorption zone to remove sulfur trioxide from the stream by absorption in the sulfuric acid. After having passed through the plurality of preliminary stages and the absorption zone, the gas stream is passed through a final contacting stage in which it is contacted with a particulate catalyst comprising vanadium and cesium, thereby substantially converting residual sulfur dioxide in the gas to sulfur trioxide.

Other objects and features will be in part apparent and in part pointed out hereinafter.

BRIEF DESCRIPTION OF THE DRAWINGS

Corresponding reference figures indicate corresponding parts in the several views of the drawings.

DESCRIPTION OF THE PREFERRED EMBODIMENTS

Figure 1:
FIGS. 1, 2, 3a–3d, 4 and 5a–5c contain electron microscopy data on a monolithic catalyst of the invention, showing discrete Pt deposits and a lattice provided by a zirconia promoter.

Monolithic catalysts of this invention have been demonstrated to be very effective for oxidation of sulfur dioxide-containing gas streams. In particular, the monolithic catalysts show improved performance characteristics over those of particulate catalysts, including higher mass and heat transfer, lower pressure drop per unit volume, and excellent physical stability. Use of the catalyst having these characteristics allows greater throughputs of $SO_2$-containing gas streams and lower capital costs per unit of $SO_3$ manufacturing capacity. Relative to the monolithic catalysts of the prior art, the monolithic catalysts of this invention have high activity per unit volume for the oxidation of $SO_2$ to $SO_3$, improved thermal and, at least in some instances, chemical stability, and the capability for regeneration and reuse.

Physical stability of the monolithic catalyst is defined by retention over a period of service of a combination of features that include mechanical stability of the monolithic support, porosity of the monolithic surface, and microstructure of the supported active phase. These factors can be measured through various tests. Mechanical stability of the monolithic structure is measured through axial crushing strength or the modulus of rupture. Retention of porosity and catalyst microstructure is assessed through a combination of tests on the monolithic catalysts for thermal and chemical stability.

Monolithic catalysts of the invention are composite materials comprising a foraminous support having cells, pores or channels through which gas may flow at high velocity and low pressure drop, a high surface area substrate and a promoter for a catalyst active phase at the foraminal wall surfaces of the support, and an active catalyst phase comprising platinum, or an alkali metal vanadium composition. Preferably, the support comprises a honeycomb shape which may have various cell shapes and diameters, but whose cells or pores are large enough to that the support is permeable to a gas flowing at high velocity. On the foraminal wall surfaces is a substrate for the active phase, the substrate comprising a finely porous (often microporous) surface coating which is either an integral part of the honeycomb support, as generated in the preparation of the support, or is provided subsequently by way of a washcoat film. An integral high surface area substrate is provided at the foraminal wall surfaces where the support is produced by co-extrusion of a high surface area/high porosity together with a lower surface area/lower porosity silica.

Where a washcoat is used, a washcoat slurry is prepared comprising the high surface area silica in a film-forming sol comprising silica, zirconia, titania or the like. The washcoat slurry is applied to the foraminal walls of the support, then dried to produce a green washcoat. The green washcoat is calcined, causing the high surface area silica to become bound to the foraminal wall surfaces by an adhesive film produced by drying and calcination of the sol.

Preferably, the promoter is also applied in the form of a sol. It may be applied over the high surface area silica substrate or, in the case of a washcoat, incorporated in the washcoat slurry. In the latter instance, the washcoat slurry may comprise the high surface area silica dispersed in a mixed sol comprising both silica and said promoter, or the promoter sol may serve by itself as the binder for the high surface area silica.

Suitable supports or substrates for the preparation of monolithic catalysts of this invention are preferably ceramic thin-walled honeycomb structures with low surface areas. Representative methods for the manufacture of such materials are given in U.S. Pat. Nos. 3,790,654 and 4,364,888, the disclosures of which are expressly incorporated herein by reference. Materials suitable for such foraminous supports include alumina, cordierite (orthorhombic magnesium aluminum metasilicate; $Mg_2Al_4O_3(SiO_3)_5$), mullite ($3Al_2O_3 \cdot SiO_2$), mullite-aluminum titanate, and titania. A preferred material for use in this invention is mullite, in particular, Corning Celcor Code 9494. Nominal cell densities of mullite honeycomb substrate include 9, 16, 25, 50, 100, 200, 300, and 400 cell per square inch (cpsi). For this invention, the preferred cell density is between about 100 and about 400 cpsi of a cross section taken transverse to the direction of flow through the catalyst. Most preferably, the cell density is between about 100 and about 300 cpsi with square cells, although the choice may vary with the specific application. The permeability of the foraminous support is such that the pressure drop of a gas containing sulfur dioxide, oxygen and nitrogen flowing at a velocity of 600 standard feet per minute through a monolithic catalyst comprising such support is not greater than about 8 inches water per lineal foot in the direction of flow. Typically the foraminous void fraction of the monolith is in the range of between about 0.25 and about 0.75.

An alternative to the above-described honeycomb supports is provided through the use of monolithic supports that combine a high porosity oxide with a low surface area oxide to produce a composite material that possesses the permeability necessary for gas flow, the fine porosity needed for effective catalyst activity and the mechanical strength conferred through the use of a low surface area oxide. Typical materials for the preparation of these silica composite honeycombs include a low density, high porosity silica powder with below 20 microns average particle size; a low surface area silica with particles having a particle size between about 20 and about 74 microns such as SUPERSIL silica from Pennsylvania Glass Sands Co.; and a silicone resin such as Dow Corning Resin Q6-2230. A plasticized mixture (or "dough") suitable for extrusion is made through the addition of an aqueous phase comprising water and a lower alcohol such as, for example, isopropyl alcohol. Further details on the composite monolithic supports of this type are given in U.S. Pat. Nos. 4,631,267, 4,631,268, and 4,637,995, the disclosures of which are expressly incorporated herein by reference. The preferred material for the monolithic catalysts of this invention is silica extruded in nominally 100 to 300 cpsi with square cells. These composite silica supports have total pore volumes from 0.25 to 0.50 mL/g with surface areas from 15 to 50 $m^2/g$. Higher pore volumes (0.50 to 0.75 mL/g) can be obtained, but the resulting silica monolithic supports lack adequate mechanical strength. As reported in U.S. Pat. No. 4,631,267, mechanical strength is adequate where the modulus of rupture is greater than 500 pounds per square inch (psi). The high porosity silica component of the silica composite monolithic support can be selected from several silica powders with high surface areas (100 to 500 $m^2/g$) or silicas with low surface areas (below 10 $m^2/g$) but high pore volumes such as diatomaceous earths. These silica honeycombs can be used with either platinum or alkali-vanadium active phases. Table I provides a listing of representative composite silica honeycombs prepared by the above referenced methods. These 200 cpsi honeycombs are characterized by the mercury intrusion porosimetry and water absorption data given. Honeycombs coded LFC-1000 and LFD-1000 were prepared using 10 and 20% diatomaceous earth, respectively.

TABLE I

| Honeycomb Code[a] | LBU-500/1000 | LBU-1000 | LFC-1000 | LFD-1000 | HOT-1000G | HOT-1000S |
|---|---|---|---|---|---|---|
| Honeycomb Number | 4269771A | 4269771B | 4344421C | 4344421D | 3740999A | 3998931B |
| Total Intrusion Volume,[b] mL/g | 0.303 | 0.309 | 0.375 | 0.419 | 0.390 | 0.361 |
| Total Pore Area,[b] $m^2/g$ | 22.2 | 22.8 | 16.9 | 40.1 | 36.1 | 20.6 |
| Median Pore Diameter,[b] μm | 0.370 | 0.387 | 0.564 | 0.633 | 0.420 | 0.524 |
| Average Pore Diameter,[b] μm | 0.0548 | 0.0541 | 0.0887 | 0.0418 | 0.0432 | 0.0699 |
| Bulk Density,[b] | 1.38 | 1.44 | 1.28 | 1.25 | 1.26 | 1.26 |

TABLE I-continued

| Honeycomb Code[a]<br>Honeycomb Number | LBU-500/1000<br>4269771A | LBU-1000<br>4269771B | LFC-1000<br>4344421C | LFD-1000<br>4344421D | HOT-1000G<br>3740999A | HOT-1000S<br>3998931B |
|---|---|---|---|---|---|---|
| g/mL<br>Water Pore<br>Volume,[c] cc/g | 0.29 | 0.29 | 0.30 | 0.35 | 0.33 | 0.34 |

[a] These honeycombs all have square cells with about 200 cells per square inch.
[b] Determined through mercury intrusion porosimetry using a Micrometrics Autopore 9220-II.
[c] Determined through modification of ASTM Method C127-84, "Standard Test Method for Specific Gravity and Absorption of Coarse Aggregate." Values shown represent averages multiple determinations.

Composite silica honeycombs exhibit a very wide range of surface area at the foraminal walls of the support. where a high surface area/high porosity silica is used in the preparation of the honeycomb, the surface area may range from 100 to 400 m² per gram of the monolith, with a pore volume of 0.5 to 2 cc/g. However, where diatomaceous earth is used, the surface area may range as low as 2 m²/g, with a porosity in the range of 1 cc/g.

In the acidic environment encountered by catalysts for the oxidation of sulfur dioxide, silica-based supports are beneficial because of their chemical stability under these conditions. The silica honeycombs above are representative of a preferred type of support for active phases for the oxidation of $SO_2$, especially when prepared using a diatomaceous earth component for porosity in the composite honeycomb material and an alkali-vanadium active phase. As noted in U.S. Pat. No. 4,631,267, these all-silica monolithic supports are attractive alternatives to washcoated honeycombs where in a high dust- and particulate-containing gas stream, the washcoat can become removed from the underlying monolithic support. However, a silica-containing washcoat applied to a mullite honeycomb support yields a very effective substrate for a platinum active phase. Furthermore, it has been found that the platinum-washcoated mullite catalyst has exceptional thermal and chemical stability. This catalyst is prepared through deposition of a silica powder as a thin film onto the surface of the honeycomb. This method of deposition after drying and calcination leads to the formation of a high surface area washcoat at the macropore surfaces of the ceramic honeycomb support. The washcoat substrate is bound to the support by a film obtained by calcination of the sol slurry from which the washcoat is deposited. The high surface area of the substrate is essential for thermal stability of the platinum active phase which, as described below, is produced in high dispersion on the monolithic catalyst. The general "washcoat" concept is discussed in U.S. Pat. Nos. 2,742,437 and 3,824,196, expressly incorporated herein by reference.

A key component to an effective washcoat composition in terms of adhesion to the underlying monolithic substrate is the presence of a film forming agent such as a sol composed of silica, zirconia, zircon, titania, or mixtures thereof. Two commercially available sols for this purpose are Nyacol Zr 10/20 and Nyacol Zircon. Silica sols suitable for use as a washcoat component of this invention may be prepared by various methods known to the art. A silica sol suitable for application of a washcoat may be derived, for example, from a siloxane such as partially hydrolyzed tetraethylorthosilicate, $Si(OC_2H_5)_4$ (TEOS), as described by S. Sakka, K. Kamiya, K. Makita, and Y. Yamamoto in the Journal of Non-Crystalline Solids, 63, 223–235 (1984). In the particular method therein described, water, ethanol, and TEOS are combined in the molar ratios of 8/4/1 with acid added as $HNO_3$ such that the acid concentration is 0.01M.

Whatever the precise manner of preparation of the silica sol, a washcoat slurry is provided by adding to the sol a silica-containing high surface area powder. In providing a substrate for a Pt catalyst, powders typically suitable for use in the washcoat slurry have a particle size of between about 2 and about 20 microns, surface area of between about 250 and about 1000 m² per gram, a micropore volume of between about 0.5 and about 2 cc/g, and a micropore diameter of between about 25 and about 500 angstroms. Illustrative of the powders which may be used in the invention are those listed in Table II. Preferably, these powders are added in amounts varying from 10 to 21% of the total washcoat slurry weight depending upon the physical properties of the powder. Routine screening will determine the optimum amount of high surface area powder to add to the silica or zirconia sol.

In accordance with the method of the invention, application of the washcoat slurry to the foraminal walls of the support is preferably effected by dipping the support in the slurry. An optimum slurry concentration is that which affords maximum uptake of high surface area silica per dip coating cycle, the cycle typically comprising dipping of the support in the slurry and release of the washcoat slurry from the honeycomb channels as assisted by a gas stream passing through the channels. To increase the loading, the dip coating cycle may be repeated after a brief drying period in air at room temperature. After the wet washcoat has been built up to the desired level by repetitive dip coating, the coated monolithic support is dried, conveniently at 100° to 150° C. in a forced air oven, and the resultant green washcoat calcined for several hours at a temperature in the range of 500 to about 800° C. Washcoat uptakes of about 10 to 20 weight-% (after calcination) are observed. Typically, after calcination, the washcoated foraminal walls of the support have an area of between about 15 and about 50 m² per gram of monolithic catalyst.

TABLE II

| Sample Code | Surface Area, m²/g | Pore Volume, cc/g | Pore Diameter,[a] angstroms | Particle Size, μm |
|---|---|---|---|---|
| Syloid 74 | 350 | 1.1 | 126 | 4 |
| Sylox 15 | 250 | 1.6 | 256 | 10–12 |
| Grade 955[b] (Ultrafines, SMR 7-6759) | 300 | 1.65 | 220 | 12.64 |
| Grade 56[c] (Milled, 325 mesh, SMR 7-6759) | 300 | 1.2 | 160 | <20 |
| Sylodent 700 | 700 | 0.6 | 34 | <20 |
| Grade 710[d] (SMR 22-213) | 480 | 0.75 | 63 | 4–20 |

TABLE II-continued

| Sample Code | Surface Area, m²/g | Pore Volume, cc/g | Pore Diameter,[a] angstroms | Particle Size, μm |
|---|---|---|---|---|
| LZ-Y20 (H-ULY[e]) | 600 | 0.48[f] | 7.4 | 1-2 |

[a] Pore diameter in Angstroms = [(40,000)(Pore Volume, cc/g)/(Surface Area, m²/g)].
[b] Similar to Grade 952 with Grade 952 data reported here.
[c] Properties cited for 103-micron (average particle size) powder.
[d] Davisil, Grade 710.
[e] Designatd as the hydrogen form of ultrastable Y zeolite, H-ULY.
[f] Reported void volume in cc/cc.

As noted, the substrate for the active phase also includes a promoter comprising an oxide or silicate of zirconium, hafnium or titanium. In accordance with the instant method, the promoter is applied from a sol as either a component of a washcoat slurry or in a separate step after the high surface area silica coating has been established at the foraminal walls of the support. The role of the promoter is to confer additional activity to the active phase and provide a means for improved thermal stabilization of the active phase. Catalytically effective amounts of the promoter oxide range from about 2 to 15 weight-%, preferably 5 to 10 weight-%, of the washcoated monolithic support. A calcination is performed at a temperature of at least 550° C. on the washcoated honeycomb substrate after addition of the promoter oxide. Preferred promoter oxides of this invention include zirconia (Nyacol Zr 10/20) and zircon (Nyacol Zircon). In the foregoing descriptions of washcoated monolithic supports, it is understood that once the promoter oxide is added, it becomes part of the washcoat so no separate specification (i.e., promoter oxide-washcoat) will be given.

In order to make use of the improved performance monolithic catalysts of this invention, the active phase must be added in the appropriate form and amount and then activated for use through a proper procedure. Active phases containing either platinum or alkali-vanadium mixtures are well-known for their effectiveness in catalyzing oxidation of sulfur dioxide in oxygen-containing gas streams. In accordance with the invention, it has been found that deposition of such active phases on the above described monolithic support and substrate produces monolithic catalysts that exhibit excellent thermal and, in some cases, chemical stability compared to known sulfuric acid catalysts, and also provide the reaction engineering advantages of monolithic catalysts.

In the catalytic oxidation of sulfur dioxide to sulfur trioxide, the monolithic catalysts of the invention exhibit significant advantages compared to the particulate supported Pt catalysts known to the art. For example, the relatively small thickness of the high surface area silica coating on the foraminal walls of the substrate, as compared to the diameter of a typical particulate catalyst, limits the depth of penetration of platinum into the bulk support to a depth much shallower than typically occurs in the case of particulate catalysts. Additionally, extruded particulate catalysts acquire a smooth outer surface as a result of the compression of the ceramic dough in the die. Consequently, the effectiveness of platinum (or other active catalyst phases) that has penetrated beneath the support surface is decreased on the particulate catalyst relative to the monolithic catalyst. The gas stream experiences much more mass and heat transfer resistance in reaching all of the available active phase catalytic sites on the particulate catalyst. For the platinum monolithic catalysts of this invention, the platinum precursor salts are selected that permit the platinum active phase to form with high dispersion uniformly distributed over the washcoat surface with stability at the same time toward thermal sintering. Air calcination and treatment of the adsorbed platinum precursor species on the washcoated support with an oxidizable gas such as $SO_2$ are effective to prepare the catalyst for use in the oxidation of sulfur dioxide.

Two water soluble platinum precursor salts are found particularly useful for the preparation of the platinum monolithic catalysts of this invention, i.e., $Pt(NH_3)_4Cl_2 * H_2O$ and $H_3Pt(SO_3)_2OH$. For the first salt, $Pt(NH_3)_4Cl_2 * H_2O$, a monolithic support having a high surface area silica at its foraminal wall surfaces is immersed in an aqueous solution of the salt, then the pH is adjusted to 10 to 11 with aqueous ammonia ($NH_4OH$). Adjustment of the pH to above 10 is essential to facilitate adsorption of the platinum(II) complex cation onto the monolithic washcoat surface. After the $Pt(NH_3)_4^{2+}$ precursor complex cation is adsorbed onto the washcoat or other high surface area silica surface, the monolithic catalyst is dried at 80°-120° C. and then optionally calcined in air at 350°-500° C. Thereafter the catalyst is treated with a gas stream containing an oxidizable gas such as $SO_2$ at temperatures from 300°-500° C. The use of $H_3Pt(SO_3)_2OH$ as a platinum source for catalytically active materials has been described in U.S. Pat. Nos. 3,992,331, 3,992,512, 4,044,193, and 4,082,699. This platinum(II) salt is available as an aqueous solution. A Pt(IV) sol obtained from a $Pt(SO_3)_2OH^{3-}$ precursor complex is generated through the addition of excess hydrogen peroxide to an aqueous solution of $H_3Pt(SO_3)_2OH$ containing the properc concentration of platinum for loading onto a monolithic substrate. In the absence of a hydroxyl-containing high area surface such as that found on the washcoated monolithic substrates of this invention, a colloidal precipitate of hydrous Pt(IV) oxide will form after several hours. However, if a washcoated monolithic substrate is immersed in the $H_3Pt(SO_3)_2OH$ solution and hydrogen peroxide is added, then a hydrous Pt(IV) oxide deposits within ten minutes on the monolithic surface. Per the instant method, the monolithic catalyst is again dried and calcined after deposition of the platinum active phase on the substrate. Calcination in air to 300° to 500° C. is adequate to prepare the monolithic catalyst for use in the oxidation of sulfur dioxide.

Platinum loading on the monolithic catalyst is typically in the range of between about 4 and about 100 g Pt per cubic foot. Preferably, the catalyst contains between about 0.03% and about 0.5% by weight Pt, more preferably between about 0.05% and about 0.15% by weight.

For effective use of the platinum active phase on a monolithic catalyst, it is essential that a promoter oxide or silicate be present on the silica-containing washcoat or silica monolithic substrate. As noted above, the preferred promoters for use with this invention are zirconia derived from a zirconia sol and zircon derived from a colloidal mixture of zirconia and silica.

It has been observed that the promoter is deposited from the sol in a lattice configuration which provides cells within which discrete particles of platinum catalyst appear to be deposited. This is indicated by the electron microscopy data of FIGS. 1 through 5, wherein particles of platinum shown in FIGS. 1, 2 and 4 appear as dark regions or spots, separated from each other by barriers (FIG. 2) that are comprised of the lattice structure of the promoter.

FIG. 1 is an overview transmission electron micrograph showing Pt deposited on a $ZrO_2$-$SiO_2$ washcoat powder removed from a finished monolithic catalyst. The platinum active phase appears as the dark regions in the micrograph. These regions average about 90 angstroms in diameter.

Figure 2:
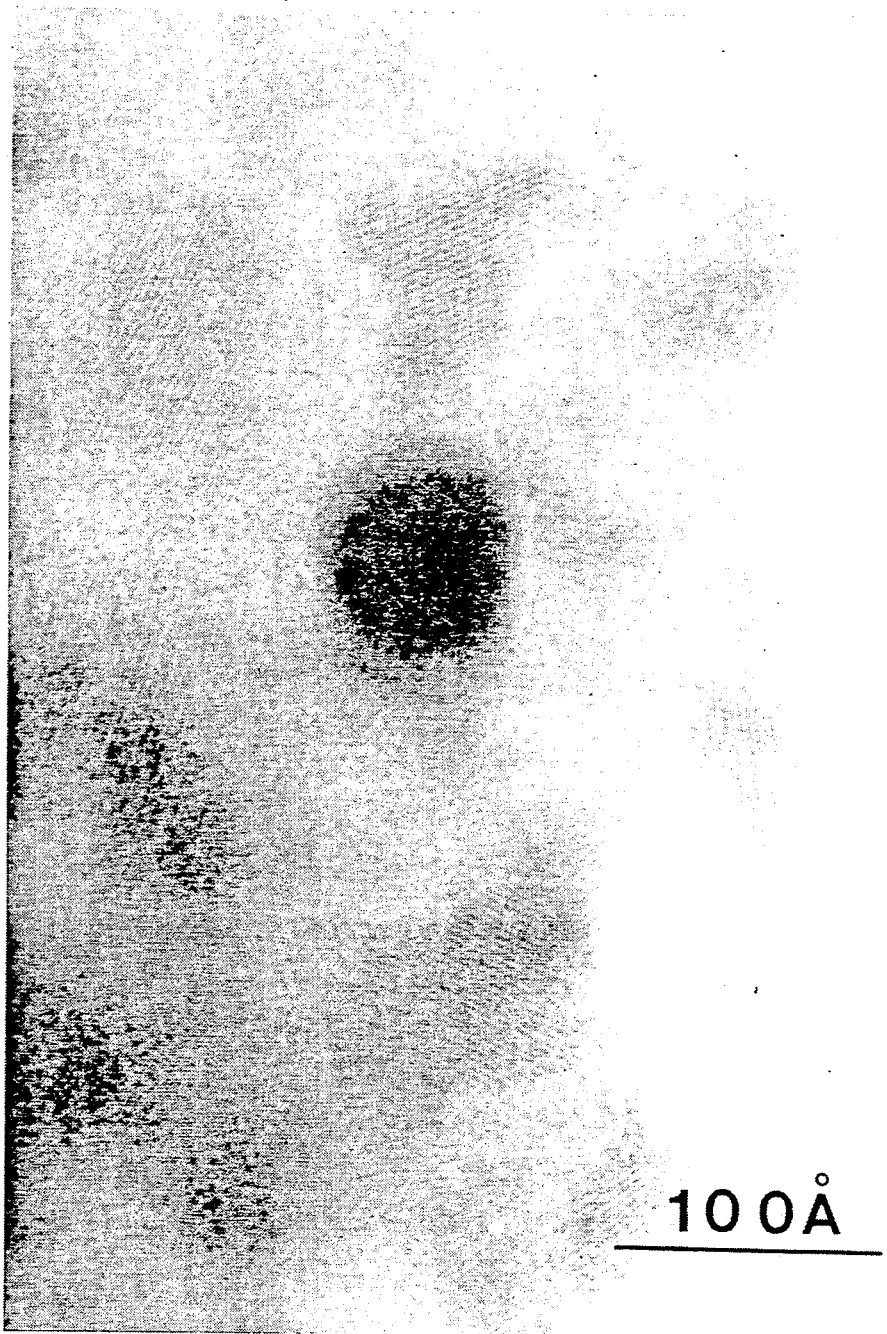
Figure 3A:
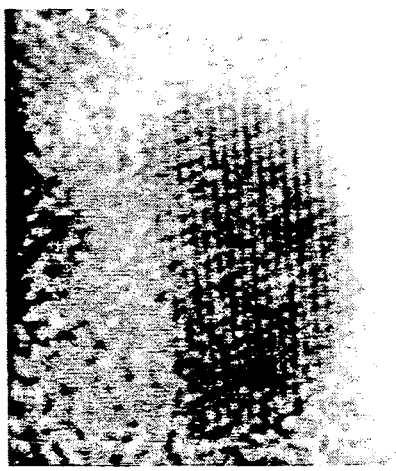
Figure 3B:
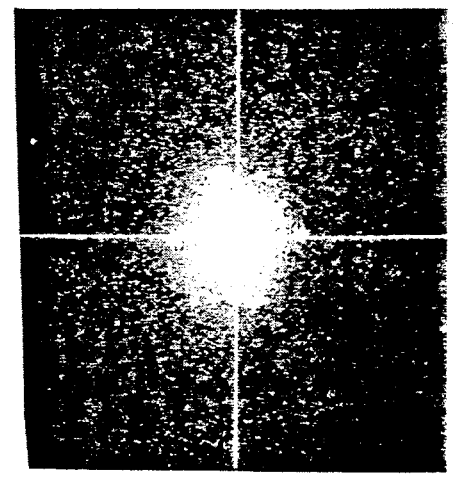
Figure 3C:
Figure 3D:
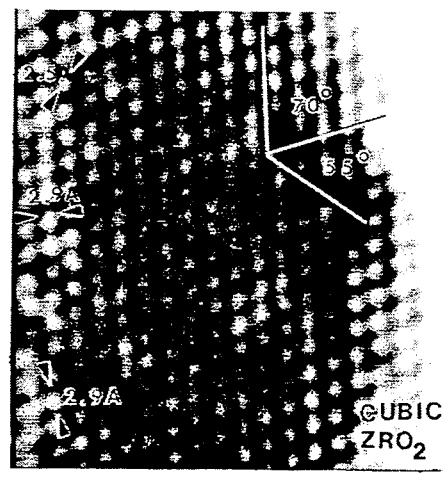

FIG. 2 is a high resolution micrograph of Pt supported on a $ZrO_2$-$SiO_2$ washcoat. Lattice fringes are exhibited by the $ZrO_2$ crystallites that very from 70 to 500 angstroms throughout the washcoat powder. The silica present in the washcoat remains amorphous.

FIG. 3 comprises an image analysis sequence for a $ZrO_2$ crystallite. In this sequence, FIG. 3(a) is a digitized image of one of the crystallites shown in FIG. 2; FIG. 3(b) is a two-dimensional power spectrum of the image of FIG. 3(a); FIG. 3(c) is a reconstructed digitized image from the power spectrum of FIG. 3(b); and FIG. 3(d) is a closeup of the reconstructed image in FIG. 3(c) showing the lattice spacings and angles that are unique to the cubic $ZrO_2$ structure.

Figure 4:
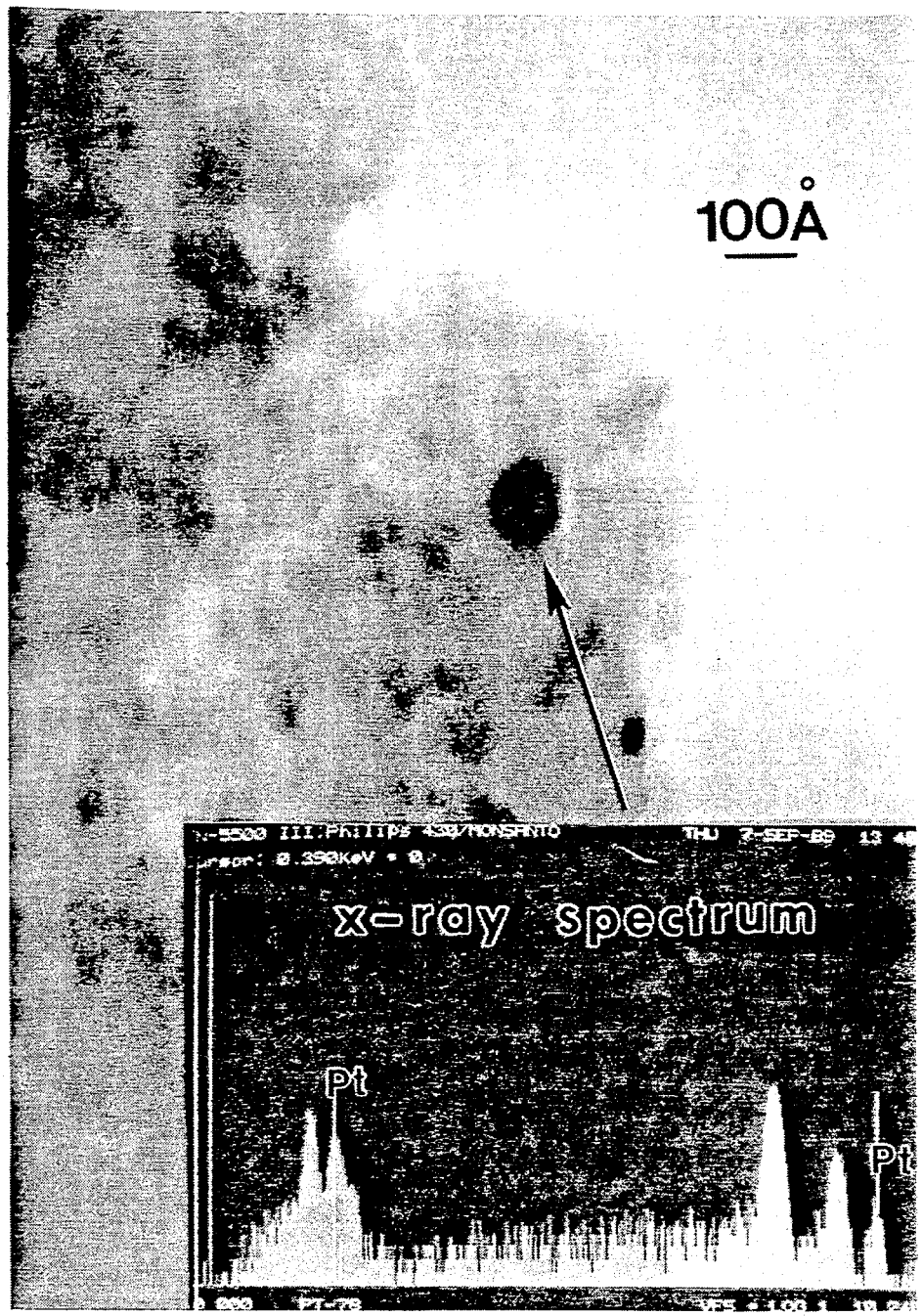

FIG. 4 is a high resolution transmission electron microscopy image showing Pt deposited on a $ZrO_2$-$SiO_2$ powder, showing identification of platinum in the dark region arrowed in the figure. The X-ray spectrum appears in the lower left inset and it identifies Pt as a primary element present in the vicinity of the arrowed region.

Figure 5A:
Figure 5B:
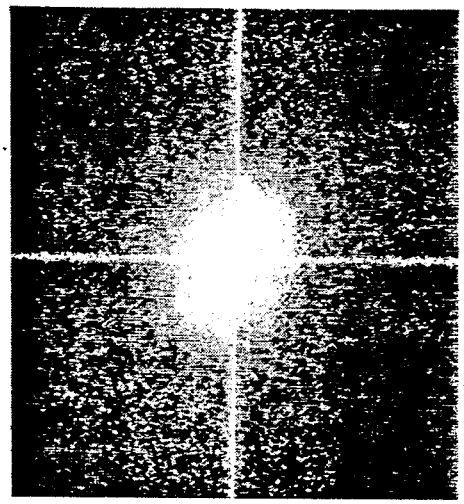
Figure 5C:
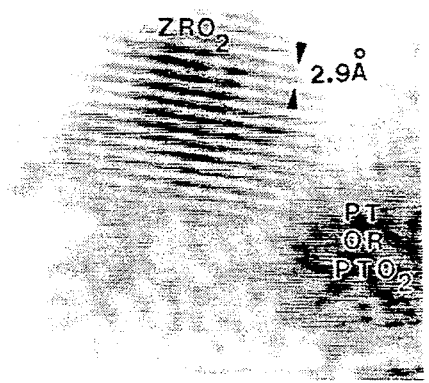

FIG. 5 comprises an image analysis sequence of various lattice fringes similar to those shown in FIG. 3. Among these, FIG. 5(a) is a digitized high resolution image of the lattice fringes area; FIG. 5(b) is a two-dimensional power spectrum generated from the image in FIG. 5(a); and FIG. 5(c) is a reconstructed image from the two-dimensional power spectrum in FIG. 5(b). Measured lattice spacings in the center region are consistent with cubic $ZrO_2$ while the lattice spacings from the lower right corner of the figure suggest the presence of either Pt metal or $PtO_2$. No evidence exists in any of these micrographs for a distinct phase formed between Pt and either $ZrO_2$ or $SiO_2$.

It is believed that the thermal stability of the monolithic catalysts of the invention may be accounted for in significant part by the effect of the lattice barriers illustrated in FIG. 2. Whatever the precise physical geometry and mechanism, promoter compounds of zirconium, hafnium and titanium are effective to maintain the dispersion of the discrete active phase particles, and to thereby prevent them from sintering. Consequently, a high active surface area is preserved for catalyzing the oxidation of sulfur dioxide to sulfur trioxide.

As noted above, it has been found that monolithic catalysts of the invention which have a Pt active phase provide high rates of conversion of sulfur dioxide to sulfur trioxide while experiencing modest pressure drop. More particularly, the activity of such catalysts under adiabatic conditions is such that the molar rate of conversion of sulfur dioxide to sulfur trioxide divided by the product of the mole fraction of sulfur dioxide and the square root of the mole fraction of oxygen in the gas phase flowing through the catalyst is at least about 12,000 moles of $SO_2$ converted per hour per liter of catalyst.

In addition to platinum active phases with a promoter oxide for the oxidation of sulfur dioxide, it is also possible to prepare alkali-vanadium-containing monolithic catalysts from the silica honeycomb substrates described above and represented by the examples in Table I. Silica honeycomb composite materials represented by honeycomb codes LFC-1000 and LFD-1000 that contain 10 and 20%, respectively, of a diatomaceous earth are particularly suitable for preparation of alkali-vanadium-containing monolithic catalysts of this invention. Although potassium makes up nearly all of the alkali content in commercially available particulate sulfuric acid catalysts, the use of alkali ions other than potassium is possible. In particular, cesium-containing catalysts have been recognized for some time as offering advantages in increased low temperature activity for the mixed alkali-vanadium active phase over catalysts containing nearly all alkali as potassium. Cesium containing catalysts are described in U.S. Pat. Nos. 1,941,426, 3,789,019, 3,987,153, 4,193,894, 4,431,573, 4,539,309, 4,680,281, and 4,766,104, and in U.S.S.R. patents 1,202,610 and 1,347,972.

The preferred alkali-vanadium catalystsests of this invention consist of one of the novel silica monolithic composite supports represented in Table I with an active phase that is applied to the silica monolith using solution impregnation of soluble salts of potassium, cesium, and vanadium followed by drying and calcination at 400° to 500° C. in an oxygen-containing atmosphere, preferably containing $SO_3$. These monolithic materials may be used in a catalytically effective manner for the oxidation of $SO_2$, particularly as low temperature "caps" upstream from a conventional particulate catalyst bed. Low temperature "cap" operation has been described by H. Jensen-Holm and T. D. King ("Oxidation of Sulphur Dioxide-New Catalyst Types," presented at the Sulphur 88 conference in Vienna. Austria, Nov. 8, 1988, pages 75-84.) and H. Jensen-Holm and O. Rud-Bendixen ("Industrial Experience with the Topsoe VK58 Sulphuric Acid Catalyst and the WSA-2 Process," Sulphur 1990 Preprints, The British Sulphur Corporation Ltd., 1990, pp. 291-310) for a cesium-containing particulate catalyst. The monolithic alkali-vanadium and platinum catalysts described here are effective at gas velocities higher than those possible with particulate catalysts (i.e., >120 SLFM) and at low temperatures (380° to 410° C.). Monolithic catalyst usage will depend upon the gas temperature, gas composition, and the flow rate. The monolithic catalysts described here are effective at high gas velocities with significantly lower pressure drop per unit volume compared to particulate catalysts.

The alkali-vanadium active phase under reaction conditions consists of molten mixture of sulfate salts dispersed evenly over the silica monolith support. The alkali ions are selected from a group consisting of sodium, potassium, rubidium, and cesium, and most preferably, mixtures of potassium and cesium salts including all-potassium and all-cesium mixtures. Loading of the active phase onto the silica support is accomplished by impregnation of a homogeneous solution of alkali and vanadium ions at any pH value that results in a soluble solution of these ions. The alkali/vanadium atomic ratio is adjusted in the range of 2:1 to 6:1. preferably between about 2.7 and about 4.0:1, more preferably 3.0 to 3.6. The optimum ratio is between about 3.3 and about 3.6:1. The optimum loading of the alkali-vanadium active phase on the silica monolithic support is adjusted in a range given by an $\alpha$ parameter (H. Livbjerg, K. F. Jensen, and J. Villadsen. Journal of Catalysis, 45, 216-230 (1976)) defined here as follows:

$\alpha = W_V/(\rho_V V_p)$, where, $W_V$ = (grams of vanadium calculated as $V_2O_5$)/(gram of silica monolith)

$p_V$ = (grams of $V_2O_5$)/(cc of liquid molten salt)

$V_p$ = pore volume of the silica monolith in cc/(gram of silica monolith)

The article by Livbjerg, et al. notes that for alkali-vanadium molten sulfate salt mixtures, the value of $p_V$ is about 0.30 g-$V_2O_5$/cc liquid using either uniform liquid film or dispersed plug models. An acceptable range of $\alpha$ values for use with the catalysts of this invention includes 0.10 to 0.40 but is preferably in the range from 0.10 to 0.30. For the silica monolithic supports used here, an $\alpha$ value around 0.30 is preferred.

Sources of vanadium useful in the preparation of an alkali vanadium catalyst include, for example, vanadyl sulfate, ammonium vanadate, and alkali metal vanadates. In preparation of the monolithic catalyst, the high porosity silica substrate at the foraminal wall surfaces of the monolithic support is impregnated with a solution containing such a vanadium compound. Preferably, the solution also contains potassium or cesium ions, and anions selected from among sulfate, carbonate, hydroxide, nitrite and nitrate. The impregnated support is thereafter dried, thereby depositing an activable catalyst mixture in the micropores of the silica substrate. Activation of the dried, impregnated alkali-vanadium salt mixture on the silica monolithic support is accomplished through a thermal treatment in a range of about 400° to about 600° C., preferably at about 500° C., in an $O_2$-containing atmosphere preferably containing $SO_3$.

Figure 6:
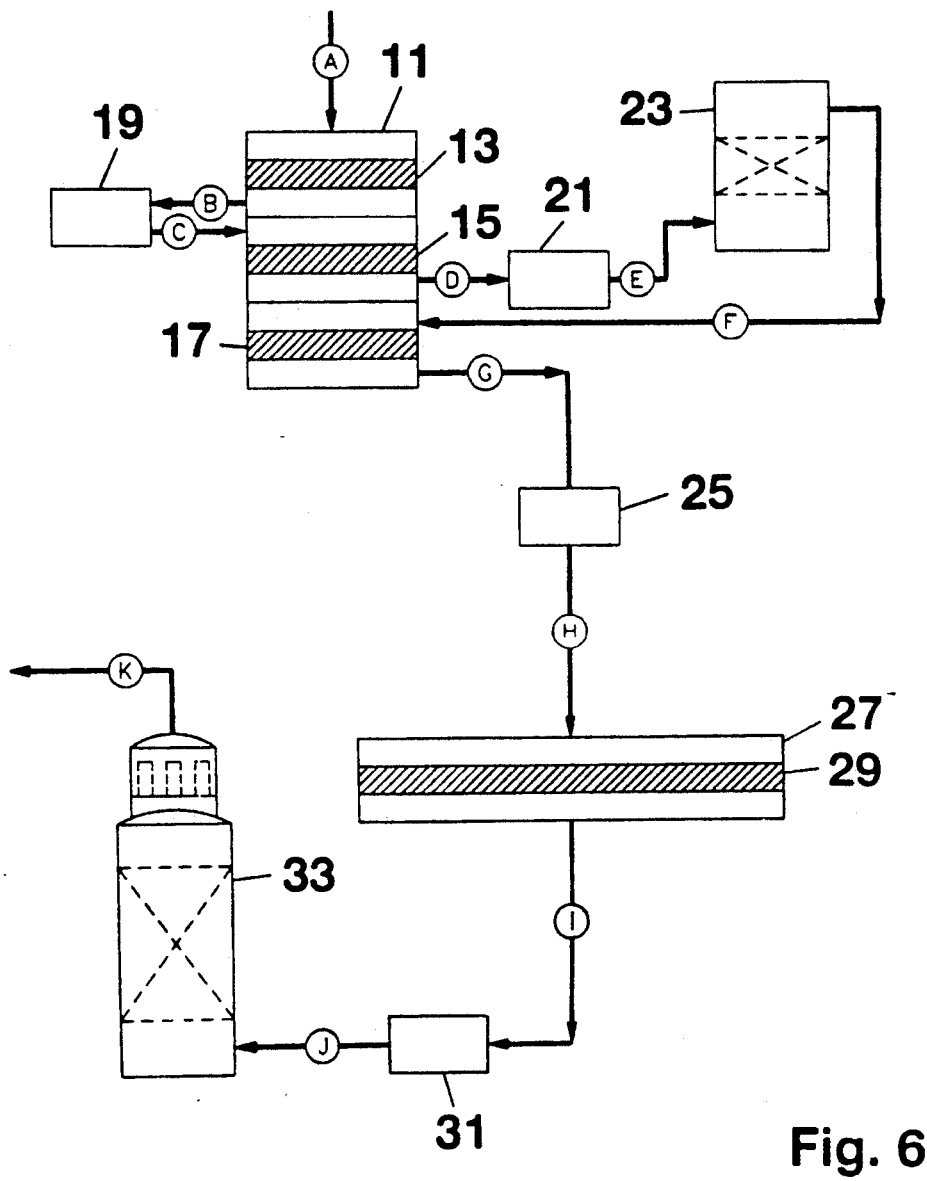
FIG. 6 is a flow sheet illustrating a novel process of the invention in which the catalysts of the invention can be used.

FIG. 6 illustrates a process for the oxidation of sulfur dioxide to sulfur trioxide in which the catalyst of the present invention may advantageously be used. A mixture of $SO_2$ and $O_2$ enters a contact converter 11 comprising three preliminary catalyst beds 13, 15 and 17. Oxidation of $SO_2$ to $SO_3$ in catalyst bed 13 results in the generation of a substantial amount of heat which is removed by passing the gas exiting stage 13 through an external heat exchanger 19, typically a waste heat boiler. Gas exiting exchanger 19 is returned to converter 11 and passed through catalyst bed 15 where further oxidation of $SO_2$ to $SO_3$ takes place. Gas leaving bed 15 is removed from the converter, passed through another heat exchanger 21, and thence through an interpass absorption tower 23 wherein the $SO_3$ contained in the gas is absorbed in sulfuric acid. Gas leaving interpass tower 23 contains unreacted $SO_2$ and $O_2$, and further oxidation of $SO_2$ to $SO_3$ is effected by returning the gas to converter 11 and passing it through catalyst bed 17. Normally, the gas leaving tower 23 must be reheated to the optimum initial temperature for third pass conversion before it is introduced into catalyst stage 17.

The pressure drop and catalytic efficiency of the monolithic catalysts of the invention are such that such catalysts may be used in each of catalyst beds 13, 15, and 17. Moreover, because of the favorable relationship between conversion rates and pressure drop, use of the catalyst of the invention in these beds allows the gas velocity through stages 13, 15 and 17, to be substantially higher, and thus the diameter of converter 11 to be substantially smaller, than would be the case if a conventional particulate alkali vanadium catalyst were used in these beds.

Gas leaving heat exchanger 25 is passed to a conventional fourth stage converter 27 containing a catalyst bed 29 comprising a particulate vanadium catalyst, preferably a Cs-V catalyst. In the fourth pass, residual $SO_2$ is converted to $SO_3$, after which the gas is passed through another heat exchanger 31, and thence through a final absorption tower 33 where the $SO_3$ is absorbed in sulfuric acid.

Because a particulate catalyst is used, the catalyst bed of converter 27 has a diameter substantially greater than that of catalyst beds 13, 15 and 17, and the flow velocity through converter 27 is substantially lower than the velocity through the beds of converter 11.

Gas leaving final absorption tower 33 is passed to the stack.

In accordance with the process of the invention, a sulfur dioxide containing gas, having an $SO_2$ content of between about 7% and about 13%, preferably about 8% to about 12%, is introduced into first preliminary monolithic catalyst stage 13, and then passed in series through further preliminary stages 15 and 17. Preferably, all three stages operate under adiabatic conditions. Because of the adiabatic operation, the gas leaving each preliminary stage is cooled, as described above, to maintain a favorable thermodynamic equilibrium in the immediately succeeding stage.

The gas enters first stage 13 (at point A) at a temperature not substantially higher than that required for calculated temperature rise to the thermodynamic equilibrium. Preferably, the gas at point A is between about 420° C. and about 450° C. The converted gas stream exiting stage 13 at point B, containing sulfur dioxide, oxygen, and sulfur trioxide, is passed through heat exchanger 19 and cooled to the desired inlet temperature to the second stage, preferably about 460° C. to about 500° C. (point C).

Further conversion of $SO_2$ to $SO_3$ occurs in the second stage, but the rate of conversion in the second stage is significantly lower than in the first stage due to depletion of $SO_2$ and inhibition by the increasing proportion of $SO_3$ that is contained in the gas stream. Consequently, the gas stream exiting the second stage at point D often may not reach the calculated adiabatic equilibrium conversion of sulfur dioxide.

Gas leaving the second stage at point D then passes through economizer 21, where the gas is cooled to a temperature above the dew point of the gas stream. Sulfur trioxide in the gas stream is then absorbed into a sulfuric acid stream in the absorption zone of the interpass absorption tower 23.

The interpass absorption tower 23 may be operated at a low acid temperature to minimize corrosion to piping and heat exchangers. Alternatively, if desired, the interpass absorption may be operated at high temperature under the conditions described in McAlister et al. U.S. Pat. Nos. 4,576,813 and 4,670,242 for recovery of the heat of absorption. In the processes of these patents, the acid entering absorption tower 23 has a temperature of at least about 120° C. and a strength of at least about 98.5%. Absorption acid discharged from tower 23 has a temperature of at least about 140° C. and a strength of at least about 99%. The discharge acid is cooled in a heat exchanger by transfer of heat to another fluid, thereby heating the other fluid to a temperature of at least about 120° C., preferably greater than about 140° C. Advantageously, steam may be generated in the heat exchanger at a pressure of, for example, about 55 psig or higher. By maintaining the acid strength throughout the cooler at $\geq 99\%$, various conventional iron/chromium and iron/chromium/nickel alloys may be used for construction of the heat exchanger.

Gas exiting tower 23 is returned to converter 11 at point F at the desired inlet temperature for the third pass, preferably between about 450° C. and about 475° C. Further conversion of sulfur dioxide occurs in stage 17 and the reaction approaches the thermodynamic equilibrium. The converted gas is cooled in heat exchanger 25 to a temperature which is above its dew point, preferably about 360° C. to about 415° C. The gas stream exiting heat exchanger 25 (at point H) is introduced into the second reactor vessel 27 containing fourth stage particulate catalyst bed 29. As in the case of the first pass, the preferred temperature of the gas entering the third and fourth passes is not substantially higher than that required for adiabatic temperature rise to the calculated thermodynamic equilibrium or near thereto.

The gas stream leaving the fourth pass (point I) is cooled in heat exchanger 31 to a conventional temperature for absorption (point J) and then passes into a final absorption tower 33 where the $SO_3$ contained in the gas is absorbed in sulfuric acid.

Under the conditions described above, the monolithic catalyst activity in the first three stages is high enough to afford high reaction rates at high gas velocities, so that the thermodynamic equilibrium is reached or closely approached in both the first and third stages. However, the gas temperatures are kept low enough that a favorable equilibrium is preserved for the reversible reaction:

$$SO_2 + \tfrac{1}{2}O_2 = SO_3.$$

and maximum conversions are achieved.

Preferably, the monolithic catalyst contained in the second and third preliminary catalyst stages (most preferably in all three preliminary stages) is of the type described above in which a promoter and a platinum active phase are deposited over a high surface area silica at the foraminal walls of a ceramic support such as mullite or extruded silica. A catalyst of this type has been found to exhibit both a moderate pressure drop per unit depth of catalyst in the direction of flow, generally less than about 12" water per lineal foot at a linear flow velocity of 600 standard ft./min., and a very high activity, so that a high conversion is achieved per unit of catalyst volume and contact time. The preferred monolithic catalysts contain between about 100 and about 400 cells per $in^2$, have wall thicknesses of about 9.3 to about 19.2 mils, and cell dimensions of between about 0.045" and about 0.084". Preferably, the wall thickness is between about 13.3 and about 14.4 mils and the cell dimensions between about 0.048" and about 0.0543".

It has been determined that a catalyst of the above described type has an activity index of at least about 12,000 moles $SO_2$ converted per hour per liter of catalyst as defined by the relationship:

$$\text{Activity Index} = \frac{\text{Moles } SO_2 \text{ Converted}}{(\text{Liter catalyst-hour}) (X_d) (X_o)^{0.5}}$$

where $X_d$ is the mole fraction of $SO_2$ contained in the gas stream fed to the catalyst stage and $X_o$ is the mole fraction of $O_2$ in the gas fed to the catalyst stage. A high activity index allows the desired conversion to be achieved with relatively brief exposure of the gas to the catalyst surface, thus requiring a relatively small volume of catalyst. Generally, the total catalyst loading for the first three catalyst stages need not be greater than about 15 liter days per short ton of equivalent sulfuric acid, i.e., $H_2SO_4$ equivalent to the $SO_2$ converted to $SO_3$ in these stages. Even at a catalyst loading in the range of 5-10 liter days per short ton of equivalent sulfuric acid, the high activity index of the catalyst provides adequate conversion at a high volumetric gas flow rate through the monolithic catalyst bed. This factor, combined with the inherently favorable flow resistance characteristic of the monolithic catalyst bed, allows the monolithic catalyst stage to be operated at substantially higher linear gas velocities than a conventional particulate catalyst bed for any given pressure drop through the contact stage. More particularly, it has been found possible to operate the first catalyst stage at superficial gas velocities above about 600 standard linear feet per minute (SLFM), preferably at least about 625 SLFM. Velocities achieved in the second and third stages are comparable, though slightly lower than for the first stage, because of conversion of $O_2$ and consequent reduction of the volumetric flow rate. For a given production capacity, because of the high velocities and rapid conversions achieved in the preliminary stages, converter 11 (which conveniently houses all three stages) may have a diameter substantially less than that of an otherwise comparable converter containing conventional particulate catalyst.

Where the $SO_2$ gas strength entering the first stage is in the range of 10-11%, and all three preliminary stages contain a monolithic catalyst of the type described above, conversions of 94-95% of the $SO_2$ entering the first stage may be achieved over these three stages. It has been found that, to achieve a total conversion of 99.7% of the gas entering the first preliminary catalyst stage, and/or to achieve an $SO_2$ emission level of not greater than about 350 ppm in the tail gas exiting the process, a particulate vanadium catalyst containing cesium is required for the final catalyst stage. A monolithic catalyst can provide a substantial conversion in the fourth stage, but no known monolithic catalyst can provide a 99.7% conversion in four stages at catalyst loadings less than particulate catalysts, even with an interpass tower located between the second and third stages. By use of a particulate Cs-V catalyst, fourth stage reaction can proceed to the thermodyamic equilibrium with a low inlet gas temperature in the aforesaid range of 360° C. to 415° C. Thus, equilibrium is reached at a low temperature, which favors a higher conversion of $SO_2$ to $SO_3$.

Because a particulate catalyst is used, the final stage is operated at conventional gas velocities. As a consequence, the vessel housing the fourth stage catalyst bed is generally of a diameter comparable to that of the final contact stage of a conventional sulfuric acid plant having the same productive capacity. However, despite the need to provide such a vessel for the fourth stage, substantial capital savings may be realized by housing the preliminary stages in a vessel of significantly smaller diameter than that required for comparable stages of the conventional process.

The particulate catalyst used in the fourth stage is an alkali metal-vanadium catalyst, the alkali metal component of which is preferably cesium. A suitable catalyst of this type is described in Villadsen U.S. Pat. No. 4,193,894. Preferably, the mole ratio of Cs to V in the particulate catalyst is at least about 0.75. Catalyst loadings for the final stage are essentially the same as those used in a conventional contact acid plant.

For the desired ultimate conversion of 99.7%, it has been found necessary that interpass absorption be conducted between the second and third stages (2:2) system. The process can be operated if the interpass absorber is located between the third and fourth stages, but the highest overall $SO_2$ conversion is achieved with a 2:2 rather than a 3:1 system.

In accordance with a further method of the invention for the manufacture of sulfur trioxide, sulfur dioxide is reacted with oxygen in converter 11 as described above in connection with FIG. 6. If desired, the sulfur trioxide may be absorbed in sulfuric acid as further depicted in FIG. 6. After a period of operation, the activity of the catalyst will typically decline, due to the combined effect of aging and exposure to the temperature, erosion and corrosion conditions prevailing during the $SO_2$ oxidation process. At that point, the catalyst may be temporarily taken out of service and treated with a mineral acid to produce a regenerated catalyst of renewed high activity. Because of the chemical stability of the catalyst of the invention, the catalyst may be subjected to vigorous treatment which has the effect of restoring its activity, not causing damage to it. Thereafter the regenerated catalyst may be placed back in service and oxidation of sulfur dioxide to sulfur trioxide resumed.

The following examples illustrate the invention.

Test Reaction Methods For Examples

Comparative reactor evaluation methods graphically were used to quantify the differences in performance between the monolithic catalysts of this invention and those existing in the prior art. Two of these methods are particularly useful for comparative studies of the ability of various materials to oxidize catalytically sulfur dioxide: (1) the thermal catalyst aging tester (TCAT) reactor and (2) the activity tester reactor.

The TCAT reactor is designed to test different catalyst samples under identical conditions for the oxidation of $SO_2$ at various inlet temperatures. Eight quartz dip-tube style reactor tubes are arranged in a circular fashion in a common electric furnace. All reactors operate under closely isothermal conditions. A common feed gas supply is mixed and delivered at the same volumetric flow rate to each sample by means of individual mass flow controllers. The inlet and outlet gas samples are analyzed by a calibrated gas chromatographic procedure and the $SO_2$ conversion of the inlet gas stream is determined. This analysis is repeated for each catalyst sample at a given inlet temperature then the inlet temperature is increased by a specified amount to a new inlet temperature. Once a set of $SO_2$ conversions for these incremented inlet temperatures is completed for all samples in their fresh states, the temperature is raised to 700°-750° C. for 24 hours. This high-temperature treatment of all samples represents a simulated accelerated aging process which the catalyst experiences in a converter at reaction conditions over a prolonged period of time. The temperature is then lowered to the lowest fresh inlet temperature and the $SO_2$ conversions are again measured for all samples. The temperatures are again incremented to give the same set of initial temperatures used for the fresh sample cycle and the $SO_2$ conversions are again measured. When this cycle is complete for all samples, the "aged" cycle $SO_2$ conversions are compared to those in the fresh cycle. The most effectively thermally stabilized catalyst samples are those which show the least decline in $SO_2$ conversions between the fresh and aged cycles at various inlet temperatures.

The second comparative reactor evaluation method uses an activity tester reactor which measures differential conversions of sulfur dioxide when a gas stream at a specified volumetric flow rate and gas composition is passed over a catalyst sample. The inlet temperature is held at between 475° to 482° C. by means of a molten lead bath that provides heating to the inlet gas stream. Both the inlet and outlet temperatures are measured by appropriately placed thermocouples. A slip stream of the outlet gas is passed through a sulfuric acid bubbler to remove the $SO_3$, then the gas stream is sampled and analyzed for $SO_2$, $O_2$, and $N_2$ using a helium carrier gas and a thermal conductivity detector. A portion of the inlet gas stream by-passes the acid scrubber and is analyzed by gas chromatography for the initial $SO_2$, $O_2$, and $N_2$ compositions. The $SO_2$ conversions are calculated for pairs of inlet-outlet gas analyses. The final $SO_2$ conversion for the sample represents an average of three measurements which has been corrected for the "blank" $SO_2$ conversion activity of the reactor. The effects of various levels of active phase loading can also be readily compared.

A third reactor system was used to evaluate the ability of the monolithic catalysts of this invention to operate under the heat and mass transfer conditions encountered in a full-sized sulfuric acid plant. Because commercial reactors for the oxidation of $SO_2$ operate under closely adiabatic conditions, an integral reactor system in the laboratory was used that would simulate a single bed of a sulfuric acid converter. The reactor consists of a stainless steel tubular reactor mounted inside a vacuum jacket to minimize heat losses. Between the outside of the stainless steel reactor and the inside of the vacuum jacket, the reactor tube is wrapped with inert insulating materials such as pieces of Fibrefrax ceramic blanket and glass tape. At various intervals down the reactor, sample tubes are located that contain thermocouples to measure the gas temperatures down the bed. Additionally, the sample tubes withdraw gas samples into a multiport rotary valve for gas chromatographic analysis. Gas is supplied to the reactor by means of mass flow controllers and may be preconverted to simulate lower pass operation. A preheater section is used to adjust the $SO_2$-containing gas stream to the desired inlet temperature to the reactor.

EXAMPLE 1

In order to identify initially classes of promoter materials for use with the platinum-containing monolithic catalysts of this invention, a series of silica particulate catalysts was prepared containing 2 weight-% (calculated as the metal in the metal oxide) of the promoter and sufficient platinum to give 0.1% Pt in the final catalyst. Shell S980G 1.7-mm silica spheres were loaded by impregnation of a promoter precursor species in aqueous solution followed by drying of the impregnated species in a rotary evaporator at 90°-100° C. The impregnated silica spheres were calcined in air at 600° C. for several hours. Platinum was deposited onto these silica spheres through immersion in an aqueous solution of $H_3Pt(SO_3)_2OH$ containing enough Pt to give 0.1% in the final catalyst. The Pt active phase precursor species was absorbed onto the silica spheres through addition of excess 30% $H_2O_2$. After at least 10 minutes, the spheres were removed from the solution, dried at 115° C., and calcined at 350° C. in air. Six samples were prepared by this general procedure with the promoter oxide and its source given in parentheses as follows: 1 (No promoter oxide added), 2 ($Fe_2O_3$, $Fe(NO_3)_3 \cdot 9H_2O$), 3 ($Cr_2O_3$, $Cr(NO_3)_3 \cdot 9H_2O$), 4 ($CeO_2$, $Ce(NO_3)_3 \cdot 6H_2O$), 5. (Al- $_2O_3$, Nalco 1SJ-614, 10% colloidal alumina), and 6 ($ZrO_2$, Nyacol Zr 10/20 zirconia sol). A seventh sample [designated 7 ($Pd(NH_3)_4Cl_2*H_2O/NH_4OH$)] was prepared by a slightly different procedure in order to insure homogeneous deposition of the platinum and palladium precursor salts. For sample 7, the silica spheres were contacted with an aqueous solution of $Pt(NH_3)_4Cl_2*H_2O$ and $Pd(NH_3)_4Cl_2*H_2O$ in sufficient quantity to give an equimolar loading of Pt and Pd (i.e., Pt/Pd=1) and such that the final loading of the metals was 0.1% Pt and 0.03% Pd. The tetraamine cations were adsorbed onto the silica spheres by addition of ammonium hydroxide such that the pH was 10.5. After one hour, the spheres were removed from the aqueous solution, dried at 115° C. then heated sequentially in air with ramping to 350° C., purging in $N_2$, and cooling to 300° C. The sample was then treated for one hour in 5% $H_2/N_2$. This procedure provides a Pt-Pd alloy supported on silica along the lines of the claims in U.S. Pat. No. 2,418,815.

All seven samples above (1-7) were loaded in identical 2.6 cc quantities into quartz reactor tubes and evaluated using the TCAT procedure described above. The results are summarized in Table III with the aged samples denoted by an "A" following the sample number. Based on comparison between the fresh and aged sample conversions from 350° to 450° C., the following ranking could be established with respect to the beneficial effect on thermal stability conferred by the promoter: 6 ($ZrO_2$)>5 ($Al_2O_3$)>2 ($Fe_2O_3$)>3 ($Cr_2O_3$)>4 ($CeO_2$)>>7 (Pd)>1 (None).

slurry each time with a nitrogen gas jet. The samples were air dried at room temperature between each cycle. The samples were then dried at 115° C. and calcined in air at 600° C. for four hours. The washcoated mullite monoliths had an average uptake of 9.6% of Syloid 74 $SiO_2$-$ZrO_2$ (S74-$ZrO_2$).

Platinum loading of the above S74-$ZrO_2$/mullite samples was through the use of a $H_3Pt(SO_3)_2OH$ stock solution containing sufficient Pt to give loadings of 5, 10, 20, 30, and 45 g-Pt/ft$^3$ based on an average volume of 10.46 cc. Each monolithic sample was immersed in a separate solution containing a total of 80 to 90 mL with the appropriate quantities of the Pt stock solution. About 1 mL of 30% $H_2O_2$ was added to each sample. After 3 hours, the samples were recovered, dried in a forced air oven at 115° C., and calcined in air at 350° C. for four hours. The recovered samples contained 4.8, 10.1, 19.4, 31.7, and 45.8 g-Pt/ft$^3$ based on their original volumes and 0.03 to 0.25% Pt based on their final weights.

The five samples were evaluated in the activity tester reactor system described above using a 10% $SO_2$, 11% $O_2$ gas stream at 9.26 standard liters per minute (SLPM). The results are shown in Table IV in terms of % $SO_2$ conversion and recalculated as a space time yield in order to compensate for sample volume variations. Comparison of the space time yields ($\times 10^6$) in Table IV shows that the sample having 19.4 g-Pt/ft$^3$ provides among the highest conversions (space time yields) with the lowest Pt loading. For honeycombs with 200 cells per square inch, a Pt loading of about 20

TABLE III

| | Catalyst | | | | | | | | | | | | | |
|---|---|---|---|---|---|---|---|---|---|---|---|---|---|---|
| | 1 | 1A | 2 | 2A | 3 | 3A | 4 | 4A | 5 | 5A | 6 | 6A | 7 | 7A |
| $SO_2$ Conversion, %, of 9% $SO_2$, 11% $O_2$ at Temperature, °C. | | | | | | | | | | | | | - | |
| 350 | 9.0 | 0.6 | 8.0 | 13.5 | 1.9 | 4.7 | 3.9 | 7.7 | 8.0 | 8.7 | 7.2 | 15.5 | 38.7 | 3.1 |
| 375 | 15.4 | 1.6 | 16.2 | 22.8 | 4.7 | 8.5 | 7.5 | 13.9 | 15.1 | 16.0 | 14.1 | 26.0 | 57.9 | 5.1 |
| 400 | 22.8 | 2.8 | 31.6 | 34.5 | 9.9 | 13.0 | 13.7 | 21.1 | 24.1 | 25.4 | 23.4 | 37.7 | 73.3 | 8.6 |
| 425 | 31.0 | 3.7 | 54.9 | 48.4 | 20.1 | 19.8 | 29.0 | 30.6 | 36.8 | 38.0 | 37.3 | 51.7 | 83.4 | 15.5 |
| 450 | 35.7 | 4.8 | 73.6 | 63.3 | 32.5 | 31.6 | 52.4 | 43.4 | 51.9 | 53.4 | 55.4 | 65.5 | 88.4 | 23.4 |

These results illustrate the promoter action of $ZrO_2$ on the platinum active phase through the ability of the promoted Pt catalyst (6) to convert $SO_2$ over a range of inlet temperatures. Thermal aging in flowing $SO_2$/$O_2$/$N_2$ at above 700° C. is seen to improve the $SO_2$ conversions of sample 6 over the 350° to 450° C. temperature range examined.

EXAMPLE 2

Five mullite honeycomb substrates with 200 cells per square inch and occupying from 9.98 to 10.89 cubic centimeters (cc) each were washcoated with a slurry prepared as follows. To 75.00 g of Nyacol Zr 10/20 zirconia sol, was added 12.52 g of Grace Syloid 74 powdered silica (Table II). The mixture was shaken to produce a homogeneous slurry and diluted with 30.00 g of water. To this slurry was added 0.28 g of Rohm & Haas Triton CF-54 and 0.14 g of BASF Pluronic L-61 surfactants. The mixture was shaken, poured into a 100-mL graduated cylinder, and placed on a magnetic stirrer. The slurry was agitated with a magnetic stir bar while used for washcoating. The mullite honeycombs were dip coated twice with the channels freed of excess g-Pt/ft$^3$ is taken as an optimum loading and is used in many subsequent preparations.

EXAMPLE 3

On the basis of the promoter effect results presented in Example 1, variations were made in the honeycomb substrate, washcoat composition and loading, promoter, and platinum precursor salt in order to identify preferred Pt-containing monolithic catalysts with respect to thermal stability. Twenty-two samples shown in Table V were prepared according to the following general procedure. The honeycomb substrate was selected as a 2.6 cc sample. The washcoat, if any, was applied to this substrate by dip coating with one of the six choices given in Table V (footnote b). The washcoat substrate was then calcined at 600° C. The promoter species, if any, was then added in a separate impregnation step followed by calcination at a separate impregnation step followed by calcination at 600° C. in air. The platinum precursor salt was then selected and deposited through facilitated adsorption onto the washcoated honeycomb substrate. The final Pt loading is recorded in the last column of Table V.

TABLE IV

| 9.6% (S74-ZrO$_2$)/Mullite, 200 cells/inch$^2$, Pt Loading, g-Pt/ft$^3$ | 4.8 | 10.1 | 19.4 | 31.7 | 45.8 |
|---|---|---|---|---|---|
| Space Velocity, /hr., 10% SO$_2$, 11% O$_2$ | 52300 | 53500 | 50600 | 55700 | 53500 |
| SO$_2$ Conversion, % | 26.8 | 42.2 | 58.5 | 59.9 | 62.7 |
| Space Time Yield$^a$, ×10$^6$ | 1.27 | 1.96 | 2.87 | 2.67 | 2.91 |

$^a$Space Time Yield = (% SO$_2$ Conversion/100)(Volumetric Flow Rate, SO$_2$)/(Space Velocity), where the Volumetric Flow Rate of SO$_2$ is 2.48 moles/hr., and Space Time Yield is given in units of moles SO$_2$ converted or moles SO$_3$ produced.

TALE V

| No. | Catalyst Description | Honeycomb Substrate$^a$ | Wash-Coat$^b$ | Promoter$^c$ | Washcoat, Weight-%$^d$ | Pt Salt$^e$ | Activation$^f$ | Loading, g-Pt/ft$^3$ |
|---|---|---|---|---|---|---|---|---|
| 8 | Pt(ZrO$_2$)/SiO$_2$ | LBU-1000 | None | 1 | 7.60 | PSA | 1 | 20.3 |
| 9 | Pt(TiO$_2$)/SiO$_2$ | LBU-1000 | None | 2 | 7.23 | PSA | 1 | 20.1 |
| 10 | Pt(TiO$_2$-SiO$_2$)/SiO$_2$ | LBU-1000 | None | 3 | 5.90 | PSA | 1 | 19.5 |
| 11 | Pt(S74-ZrO$_2$)/Mullits | 9494 | 1 | None | 15.51 | PSA | 1 | 20.1 |
| 12 | Pt(TiO$_2$-SiO$_2$-S74-ZrO$_2$)/-Mullite | 9494 | 1 | 3 | 11.15 | PSA | 1 | 19.3 |
| 13 | Pt(S74-ZrO$_2$ × 2)/Mullite | 9494 | 1$^g$ | None | 15.89 | PSA | 1 | 18.5 |
| 14 | Pt(ZrO$_2$-S74-SiO$_2$)/Mullite | 9494 | 2 | 1 | 22.06 | PSA | 1 | 20.5 |
| 15 | Pt(S74-Zircon)/Mullite | 9494 | 3 | None | 9.98 | PSA | 1 | 20.0 |
| 16 | Pt(S74-Zircon)/Mullite | 9494 | 3 | None | 9.95 | PTA | 1 | 20.0 |
| 17 | Pt(ZrO$_2$-S74-SiO$_2$)/Mullite | 9494 | 2 | 1 | 15.83 | PSA | 1 | 20.0 |
| 18 | Pt(Zircon-S74-SiO$_2$)/Mullite | 9494 | 2 | 4 | 17.49 | PSA | 1 | 20.0 |
| 19 | Pt(ZrO$_2$-S74-SiO$_2$)/Mullite | 9494 | 2 | 1 | 15.96 | PTA | 1 | 20.0 |
| 20 | Pt(Zircon-S74-SiO$_2$)/Mullite | 9494 | 2 | 4 | 17.48 | PTA | 1 | 20.0 |
| 21 | Pt(ZrO$_2$-S74-SiO$_2$)/Mullite | 9494 | 2 | 1 | 21.79 | PSA | 1 | 20.5 |
| 22 | Pt(G710-ZrO$_2$)/Mullite | 9494 | 4 | None | 10.93 | PSA | 1 | 20.0 |
| 23 | Pt(Al$_2$O$_3$)/Cordierite | 9475 | — | — | — | — | — | 20.3 |
| 24 | Pt(H-ULY-SiO$_2$)/Mullite | 9494 | 5 | None | 20.36 | PTA$^h$ | 2 | 44.0 |
| 25 | Pt(ZrO$_2$-(S74-SiO$_2$) ×2)/Mullite | 9494 | 2$^g$ | 1 | 14.45 | PTA | 1 | 20.2 |
| 26 | Pt(ZrO$_2$-(S74-SiO$_2$) ×2)/Mullite | 9494 | 2$^g$ | 1 | 15.29 | PTA | 1 | 20.2 |
| 27 | Pt(H-ULY-SiO$_2$)/Mullite | 9494 | 5 | None | 20.36 | PTA$^h$ | 2 | 54.4 |
| 28 | Pt(ZrO$_2$-SiO$_2$)/Mullite | 9494 | 6 | 1 | 18.10 | PSA | 2 | 39.6 |
| 29 | Pt(ZrO$_2$-SiO$_2$)/Mullite | 9494 | 6 | 1 | 19.45 | PTA | 2 | 44.1 |

$^a$Codes are as follows: LBU-1000, silica substrate, 200 cells/inch$^2$ (cpsi); 9494, Corning Celcor, Mullite substrate with 200 cpsi; 9475, Corning Celcor, Cordiertie substrate with 400 cpsi.
$^b$Washcoat weight-% compositions as follows: 1, 10.7% Syloid 74 (S74) – 63.8% Nyacol Zr 10/20 – 25.5% water; 2, 15.0% S74 – 85.0% silica sol from Si(OC$_2$H$_5$)$_4$, TEOS (27.0% water, 33.0% ethanol, 40.0% TEOS, 0.01 M HNO$_3$); 3, 10.7% S74 – 63.8% Nyacol Zircon – 25.5% water; 4, 12.0% Davisil Grace 710 – 88.0% water; 5, 20.9% H-ULY – 79.1% silica sol from TEOS; 6, Nalco 2327 40% colloidal silica. Each sample was calcined at 600° C. in air after dip coating in the washcoat.
$^c$Promoters include: 1, Nyacol Zr 10/20; 2, 1:1 colloid of Nalco TX 2588 colloidal titania and water; 3, equal weights of promoter 2 colloid and Nalco 2327 40% colloidal silica; 4, Nyacol Zircon, a mixture of ZrO$_2$ and silica colloids. The sample was calcined at 600° C. in air after impregnation with the promoter solution.
$^d$Total-% of the washcoat and promoter added to the honeycomb substrate.
$^e$Abbreviations: PSA = H$_3$Pt(SO$_3$)$_2$OH solution diluted to the appropriate concentration and adsorbed onto the substrate through addition of 30% H$_2$O$_2$. PTA = Pt(NH$_3$)$_4$Cl$_2$·H$_2$O dissolved to the appropriate concentration in water and adsorbed onto the substrate through addition of sufficient NH$_4$OH to bring the pH to above 10
$^f$Procedures used include: 1, calcination in air at 500° C.; 2, sequential oxidation in air followed by reduction in an H$_2$-containing gas stream as described in U.S. Pat. No. 4,582,650, example 1.
$^g$This catalyst was given two washcoats and is designated as such by "×2."
$^h$This Pt salt was adsorbed onto the washcoated sample through ion exchange with the ammonium form of H-ULY present in the washcoat.

Samples 8-20 were evaluated through a series of TCAT reactor runs with the results for these 13 samples compiled in Table VI. The aged cycle SO$_2$ conversions are given in the first column to the right of the fresh cycle and are denoted by an "A" following the sample number column heading as was done in Example 1. Careful inspection of the data gives the following ranking in terms of retained SO$_2$ conversion activity over the 350° to 450° C. temperature range: 14>19>17>11>13>20>18>16>8>9>15>>12->10. In this sequence, the highest thermal stabilities were shown by samples 14, 19, and 17, all of which contained a "ZrO$_2$-S74-SiO$_2$" washcoat composition. The poorest thermal stabilities were shown by the two samples in which no form of zirconium was added, namely samples 12 and 10. These samples exhibit unacceptable thermal stability and are not part of the preferred monolithic catalysts of this invention. The remaining eleven samples constitute preferred Pt-containing monolithic catalysts.

TABLE VI

| | Catalyst | | | | | | | | | | | | | |
|---|---|---|---|---|---|---|---|---|---|---|---|---|---|---|
| | 8 | 8A | 9 | 9A | 10 | 10A | 11 | 11A | 12 | 12A | 13 | 13A | 14 | 14A |
| SO$_2$ Conversion, %, of 9% SO$_2$, 11% O$_2$ at Temperature, °C. | | | | | | | | | | | | | | |
| 350 | 19.2 | 11.4 | 29.1 | 11.5 | 20.8 | 5.8 | 18.8 | 17.3 | 18.3 | 9.7 | 25.1 | 18.8 | 31.7 | 47.4 |
| 375 | 34.6 | 21.2 | 48.9 | 20.5 | 35.3 | 10.1 | 34.1 | 31.0 | 32.6 | 17.8 | 40.9 | 31.8 | 50.4 | 67.8 |
| 400 | 53.5 | 33.2 | 68.0 | 31.5 | 52.8 | 14.5 | 51.7 | 48.1 | 50.6 | 27.4 | 57.6 | 46.8 | 67.9 | 80.6 |
| 425 | 70.1 | 46.7 | 79.7 | 42.3 | 69.5 | 19.7 | 68.1 | 64.0 | 68.4 | 35.5 | 71.7 | 60.7 | 79.3 | 87.8 |
| 450 | 79.2 | 60.1 | 84.0 | 52.5 | 79.2 | 29.0 | 76.5 | 74.3 | 78.8 | 44.2 | 80.2 | 70.6 | 84.9 | 90.3 |
| | Catalyst | | | | | | | | | | | | | |

TABLE VI-continued

|  | 15 | 15A | 16 | 16A | 17 | 17A | 18 | 18A | 19 | 19A | 20 | 20A |
|---|---|---|---|---|---|---|---|---|---|---|---|---|
| $SO_2$ Conversion, %, of 9% $SO_2$, 11% $O_2$ at Temperature, °C. | | | | | | | | | | | | |
| 350 | 17.7 | 9.0 | 13.2 | 11.8 | 27.4 | 22.7 | 26.7 | 16.9 | 26.1 | 30.9 | 18.1 | 17.1 |
| 375 | 30.0 | 17.3 | 23.9 | 22.3 | 44.4 | 37.7 | 42.8 | 29.0 | 42.6 | 48.4 | 31.1 | 30.5 |
| 400 | 45.3 | 28.3 | 39.0 | 36.2 | 62.5 | 53.4 | 59.9 | 42.4 | 60.0 | 65.0 | 47.6 | 46.0 |
| 425 | 62.4 | 40.9 | 59.0 | 52.0 | 75.7 | 67.4 | 74.6 | 56.9 | 74.2 | 77.8 | 63.8 | 62.6 |
| 450 | 77.5 | 52.1 | 78.2 | 65.5 | 81.8 | 76.8 | 82.2 | 68.1 | 81.1 | 85.0 | 78.0 | 75.1 |

EXAMPLE 4

This example uses TCAT reactor data to compare thermal stabilization by zirconium and aluminum containing washcoats. Four samples numbered 21 to 24 were prepared according to the procedures summarized in Table V. Sample 21, $Pt(ZrO_2-S74-SiO_2)$/Mullite, represents a preferred embodiment of this invention. Sample 22 uses Davisil Grade 710 silica in combination with Nyacol Zr 10/20 to produce a $Pt(G710-ZrO_2)$/Mullite sample. Sample 23 represents a cored out piece from a commercial sample of 400 cells per square inch, Johnson Matthey 1000J/W12 CAB/18.00 C/400/6, designated as $Pt(Al_2O_3)$/Cordierite. Sample 24 was prepared using variations of methods cited in Example 2 and Pt loading according to example 1 of U.S. Pat. No. 4,582,650. Sample 24 contains an acid stabilized form of aluminum in the H-ULY washcoat and represents a preferred embodiment of this invention. Samples 21 and 22 constitute zirconium-containing catalysts while samples 23 and 24 are aluminum-containing samples. The TCAT reactor data are summarized in Table VII. All four samples were run at the same time and the ranking according to retained activity in the aged cycle is 21>23>24>22. All four samples show acceptable retention of activity.

EXAMPLE 5

Thermal stability retention alone is insufficient to distinguish the preferred platinum monolithic catalysts of this invention from commercially available samples (sample 23 in Table V) representative of the prior art. Monolithic samples were therefore subjected to some chemical stability tests.

Two monolithic samples, 19 and 20 in Table V, were recovered from the TCAT reactor after a single accelerated thermal aging cycle shown in Table VI. These samples represent preferred embodiments of this invention. The samples were weighed then immersed in boiling water for 30 minutes. After drying and calcination at 500° C. in air the samples were reweighed and the weights compared. Aged samples 19 and 20, denoted as 19A and 20A, were found to lose only 0.22 and 0.28% of their original weight. This test shows the hydrolytic stability of the preferred samples of this invention.

TABLE VII

|  | Catalyst | | | | | | | |
|---|---|---|---|---|---|---|---|---|
|  | 21 | 21A | 22 | 22A | 23 | 23A | 24 | 24A |
| $SO_2$ Conversion, %, of 9% $SO_2$, 11% $O_2$ at Temperature, °C. | | | | | | | | |
| 350 | 26.4 | 46.6 | 20.4 | 12.4 | 29.3 | 31.8 | 34.6 | 15.8 |
| 375 | 43.6 | 66.3 | 35.3 | 22.9 | 45.8 | 49.3 | 55.1 | 27.7 |
| 400 | 61.6 | 79.8 | 51.3 | 36.8 | 60.2 | 65.8 | 73.5 | 42.7 |
| 425 | 75.2 | 87.3 | 65.7 | 52.5 | 71.1 | 77.8 | 85.9 | 60.6 |
| 450 | 83.2 | 90.2 | 74.7 | 65.1 | 76.9 | 83.9 | 91.9 | 75.3 |

A more severe test was then conducted on two pairs of samples: 25 and 26, preferred samples of this invention denoted as $Pt(ZrO_2-(S74-SiO_2)\times 2)$/Mullite, and 23 and 23L, representative of the commercial $Pt(Al_2O_3)$/Cordierite samples. Samples 26 and 23L are essentially identical to 25 and 23, respectively, except they were subjected to the following acid leaching test. The samples were immersed in a stirred solution of 30% $H_2SO_4$ and heated to 95° C. for 24 hours. The samples were rinsed free of the acid solution, dried at 115° C., then calcined at 500° C. for 4 hours. Initial and final weights were recorded for samples 26 and 23L. The acid leached samples after calcination were found to have weight losses of 0.98% for $Pt(ZrO_2-(S74-SiO_2)\times 2)$/Mullite, 26, and 59.52% for $Pt(Al_2O_3)$/Cordierite, 23L. Duplicate samples of each gave closely similar values. Sample 23L was seen to have lost most of its washcoat including the Pt active phase. On the other hand, sample 26 appeared essentially identical in appearance to that of 25 as evidenced by its small weight loss.

Samples 19A, 20A, 25, 26, 23, and 23L were evaluated using the TCAT reactor system. Differential conversion data over the temperature range 350° to 450° C. are recorded in Table VIII. The aged cycles are represented by an "A" following the sample numbers, so in the case of samples 19A and 20A, the aged samples are labelled as 19AA and 20AA, respectively.

TABLE VIII

|  | Catalyst | | | | | | | | | | | |
|---|---|---|---|---|---|---|---|---|---|---|---|---|
|  | 19A | 19AA | 20A | 20AA | 25 | 25A | 26 | 26A | 23 | 23A | 23L | 23LA |
| $SO_2$ Conversion, % of 9% $SO_2$, 11% $O_2$ at Temperature, °C. | | | | | | | | | | | | |
| 350 | 16.2 | 25.1 | 21.3 | 17.1 | 11.6 | 15.4 | 33.4 | 14.6 | 37.0 | 29.2 | 8.4 | 1.8 |
| 375 | 29.1 | 42.1 | 35.9 | 30.3 | 21.0 | 27.3 | 52.7 | 26.1 | 54.0 | 46.8 | 14.6 | 3.6 |
| 400 | 43.5 | 59.5 | 52.4 | 46.4 | 34.6 | 41.5 | 69.6 | 41.4 | 68.1 | 64.0 | 22.9 | 6.2 |
| 425 | 58.9 | 73.7 | 68.1 | 62.7 | 51.9 | 56.4 | 80.4 | 57.6 | 77.1 | 76.9 | 34.4 | 9.9 |
| 450 | 72.0 | 81.9 | 79.0 | 75.0 | 70.3 | 68.7 | 85.9 | 70.5 | 80.5 | 83.8 | 47.1 | 13.3 |

The comparison of the fresh and aged cycles in Table VIII permits the following thermal stability ranking: 23>19A>20A>25=26>>23L. Note that the acid leached sample of this invention (26) is indistinguishable from that of the unleached sample (25) in thermal stability. However, the commercial Pt($Al_2O_3$)/Cordierite sample showed very good thermal stability as shown before in Example 4 but once exposed to aqueous acid, the ($Al_2O_3$)/Cordierite formulation was severely damaged. Aqueous acid attack can occur in sulfuric acid plant converters during shutdowns and upsets when moisture is allowed into the catalyst bed areas. Platinum cannot be considered well anchored on an alumina washcoat due to the chemical instability of this washcoat in an acid environment.

The excellent acid leaching stability for sample 26 can be further used to advantage in regenerative treatment to remove base metal particulates that accumulate on the monolithic catalyst over a period of time. The acid leaching data combined with the TCAT reactor in Table VIII show that preferred monolithic catalysts including the Pt active phase are stable toward acid attack. Nearly all metal oxides and sulfates of the first transition series and the main group will be dissolved under the conditions of treatment with 30% $H_2SO_4$ at 95° C. for 24 hours. Thus, the preferred monolithic catalysts can be acid leached to remove metal-containing deposits with essentially no losses in either mass or $SO_2$ conversion activity.

EXAMPLE 6

In order to test the ability of various monolithic catalysts to withstand the thermal treatments experienced in a commercial sulfuric acid first pass converter, a set of four samples was loaded into a metal basket and placed in larger sleeve containing a conventional particulate sulfuric acid catalyst that is available from Monsanto Enviro-Chem under the trade designation LP-120. The sleeve was left in the first pass of a metallurgical sulfuric acid plant for one year. First pass differential conversions were recorded on each of the samples before loading them into the first pass sleeve. The conversions were measured again after one year on each of the samples directly after recovery from the sleeve. No treatment of any kind was performed on these recovered samples. The results are summarized in Table IX for samples 27, 28, 29, and 23F. These samples are identified in Table V with respect to their composition and preparation. Sample 23F represents a cored out fresh sample from 23 listed in Table V.

The results in Table IX show that only the Pt(H-ULY-$SiO_2$)/Mullite sample (27) retains a high level of its original activity. Samples 28 and 29 were prepared from colloidal silica washcoats and promoted with colloidal zirconia. Use of colloidal silica washcoats for preparation of monolithic catalysts is taught in U.S. Pat. No. 3,518,206. Samples 28 and 29 along with 23F all show poor activity retention after one year of first pass converter aging. The formulation of sample 27, as noted in Example 4, is one of the preferred embodiments of this invention.

TABLE IX

|  | Catalyst | | | |
| --- | --- | --- | --- | --- |
|  | 27 | 28 | 29 | 23F |
| Space Velocity, /hr., 8% $SO_2$, 13% $O_2$ | 50700 | 62200 | 66100 | 69500 |
| Inlet Temperature, °C. | 480 | 480 | 480 | 481 |

TABLE IX-continued

|  | Catalyst | | | |
| --- | --- | --- | --- | --- |
|  | 27 | 28 | 29 | 23F |
| $SO_2$ Conversion, %, Fresh | 67.07 | 58.05 | 53.13 | 56.49 |
| Space Time Yield,$^a$ × $10^6$, Fresh | 2.62 | 1.85 | 1.59 | 1.61 |
| $SO_2$ Conversion, %, Aged | 62.58 | 19.71 | 20.75 | 15.13 |
| Space Time Yield,$^a$ × $10^6$, Aged | 2.45 | 0.63 | 0.62 | 0.43 |

$^a$Space Time Yield = (% $SO_2$ Conversion/100)(Volumetric Flow Rate, $SO_2$)/(Space Velocity), where the Volumetric Flow Rate is 1.98 moles/hr., and the Space Time Yield is given in units of moles of $SO_2$ converted or moles of $SO_3$ produced.

EXAMPLE 7

Alkali-vanadium-containing silica composite monolithic catalysts represent preferred embodiments of this invention. The use of silica composite honeycomb substrates affords much more mechanical strength than honeycomb substrates prepared from 100% of a porous silica powder such as diatomaceous earth. These silica composite monolithic catalysts are shown in this example to have excellent thermal stability toward high-temperature accelerated aging. Two 2.6 cc samples of the LFC-1000 and LFD-1000 silica monolithic substrates given in Table I were impregnated with the sulfate salts of cesium and vanadium (IV), dried at 90° C., and calcined in a 500° C. $SO_3$-containing gas stream. These samples have Cs/V = 3.34 and α values of 0.30, with the α parameter used as defined above. These samples were loaded into the TCAT reactor tubes as samples 31 (LFC-1000) and 32 (LFD-1000) along with a 2.6 cc sample of 10 to 20 mesh of LP-120 catalyst having a K-V formulation, designated sample 30. The TCAT reactor data are shown in Table X.

Over the temperature range of 360° to 420° C., the preferred monolithic catalysts of this invention, samples 31 and 32, show essentially no decline in $SO_2$ conversion activity upon thermal aging at above 700° C. for 24 hours. However, the particulate formulation shows a detectable decline in activity and is much less active for the same volume of catalyst. In addition to thermal stability, this illustrates the low temperature promotional effect of cesium compared to that of potassium in the commercial particulate catalyst.

TABLE X

|  | Catalyst | | | | | |
| --- | --- | --- | --- | --- | --- | --- |
|  | 30 | 30A | 31 | 31A | 32 | 32A |
| $SO_2$ Conversion, %, of 9% $SO_2$, 11% $O_2$ at Temperature, °C. | | | | | | |
| 360 | 3.4 | 3.6 | 3.7 | 9.9 | 7.0 | 11.7 |
| 370 | 5.1 | 5.6 | 5.1 | 14.7 | 10.9 | 17.2 |
| 380 | 7.3 | 8.1 | 13.8 | 22.0 | 18.0 | 26.6 |
| 390 | 10.8 | 12.1 | 25.1 | 32.9 | 28.5 | 40.7 |
| 400 | 16.2 | 17.1 | 40.0 | 46.8 | 45.3 | 55.4 |
| 410 | 26.5 | 23.3 | 58.7 | 59.6 | 58.7 | 64.8 |
| 420 | 42.0 | 33.3 | 67.8 | 67.3 | 67.8 | 71.8 |

EXAMPLE 8

The preferred alkali-vanadium monolithic catalysts of this invention can be operated at gas flows higher than 120 standard linear feet per minute (SLFM). This example demonstrates the use of cesium as an active phase promoter for increasing $SO_2$ conversions per unit volume of catalyst. The amount of cesium added was varied according the inlet gas temperature and $SO_2$ content of the gas stream.

A series of four alkali-vanadium monolithic catalysts was prepared according to the procedure described in example 7. Each catalyst has an LFC-1000 silica composite honeycomb substrate, $(Cs+K)/V=3.34$, and $\alpha=0.30$, but vary in the Cs-K content. The catalysts are designated $K_{3.34}$ (33), $Cs_{0.75}$-$K_{2.59}$ (34), $Cs_{1.50}$-$K_{1.84}$ (35), and $Cs_{3.34}$ (36) with the numbers in parenthes corresponding to the sample number. Differential conversions were measured at 125 SLFM for the four Cs-K-V-containing monolithic catalysts using both 10 and 8% $SO_2$ gas streams. The results are given in Table XI for a constant inlet temperature of 480° C. The $SO_2$ conversion (also reported as space time yields to factor out the effect of slightly variable sample volumes) shows a smooth variation between the all potassium-containing sample (33) and the all cesium-containing sample (36).

In a preferred embodiment of this invention, cesium is used as a substitute for some or all of the potassium ions in the alkali-vanadium active phase of these silica composite monolithic catalysts. The differential conversion results in Table XI show a marked improvement in $SO_2$ conversion activity as the cesium content is increased. These results in addition to the mechanical strength possessed by the silica composite honeycomb substrates show clear improvements over the catalyst materials prepared by German patent DE 39 10 249.

TABLE XI

| | Catalyst | | | |
|---|---|---|---|---|
| | 33 | 34 | 35 | 36 |
| Space Velocity, /hr., 10% $SO_2$, 11% $O_2$; 8% $SO_2$, 13% $O_2$ | 91700 | 92900 | 91700 | 93600 |
| Inlet Temperature, °C. | 480 | 480 | 480 | 480 |
| $SO_2$ Conversion, %, of 10% $SO_2$ | 3.87 | 5.70 | 6.91 | 7.45 |
| Space Time Yield,[a] × 10[6], 10% $SO_2$ | 1.95 | 2.84 | 3.49 | 3.69 |
| $SO_2$ Conversion, %, of 8% $SO_2$ | 6.02 | 8.36 | 9.65 | 10.41 |
| Space Time Yield,[b] × 10[6], 8% $SO_2$ | 2.45 | 3.36 | 3.92 | 4.14 |

[a]Space Time Yield = (% $SO_2$ Conversion/100)(Volumetric Flow Rate, $SO_2$)/(Space Velocity), where the Volumetric Flow Rate is 4.63 moles/hr., and the Space Time Yield is given in units of moles of $SO_2$ converted or moles of $SO_3$ produced.
[b]Space Time Yield same as defined in footnote except the Volumetric Flow Rate is 3.71 moles/hr.

EXAMPLE 9

A set of 12 silica composite monolithic catalysts with an average volume of 34.57 cc and 2.40 cm in diameter were loaded into a tubular reactor. These samples were prepared with the same composition and procedure as those for sample 36 in Example 8. The reactor was loaded into a vacuum jacketed vessel and sealed. Gas streams containing 8 and 10% $SO_2$ were passed through the reactor at 125 SLFM. The gas temperatures were monitored down the reactor in order to determine the point at which a temperature of 425° C. was obtained in this closely adiabatic reactor. Inlet temperatures were varied from 380° to 410° C. at 10° C. intervals. Based on the observed temperatures, the bed depth to the nearest inch was determined in which a temperature rise to 425° C. would be observed. A summary of the bed depths is given in Table XII.

TABLE XII

| Inlet Temperature, °C. | Bed Depth in Inches Required to Give 425° C. for the $SO_2$ Gas Strength | |
|---|---|---|
| | 8% | 10% |
| 380 | 33 | 27 |
| 390 | 19 | 21 |
| 400 | 8 | 12 |
| 410 | 3 | 5 |

At a temperature of 425° C., a conventional bed of K-V particulate sulfuric acid catalyst gives an adiabatic temperature rise to yield essentially the theoretical equilibrium conversion of the $SO_2$ in the gas stream (75.5 and 67.5% conversions of 8 and 10% $SO_2$, respectively, gas streams). Through the use of low temperature (380°–410° C.) caps of cesium-containing alkali-vanadium monolithic catalyst upstream from a conventional particulate sulfuric acid catalyst bed, the overall conversion in the first pass can be increased with more heat generated for recovery.

EXAMPLE 10

Twelve monolithic catalyst samples each having an average diameter of 2.38 cm and an average volume of 34.22 cm[3] were loaded in series into a tubular reactor with gas sampling tubes containing thermocouples after each sample. The samples comprised a mullite substrate and corresponded to catalyst No. 17, Table V, prepared according to the methods described in Example 3 and possessed about 200 square cells of mullite substrate per square inch of cross-sectional area. A platinum active phase was dispersed on washcoated the mullite substrate such that an average of 20.18 grams of platinum per cubic foot (including solid and void volume) of monolithic substrate was present. Pieces of glass fiber were wrapped around the monolithic catalyst samples in order to position the samples within the tube and to minimize gas by-passing. The samples were used to simulate the operation of the first three passes of the process shown in FIG. 6. A gas stream consisting initially of 10.0% $SO_2$ and 10.9% $O_2$ at a volumetric flow rate of 84.81 standard liters per minute (SLPM) was passed over the monolithic samples at various inlet temperatures. The corresponding gas velocity of this gas stream is 624 standard linear feet per minute (SLFM) to pass 1. After the sixth sample corresponding to 18 inches of catalyst, the conversion of the $SO_2$ in the gas stream was measured and found to equal essentially the adiabatic equilibrium conversion value. The pressure drop across the entire 12 samples was measured and scaled to 18 inches of catalyst depth. A similar procedure was followed for passes 2 and 3 with the appropriate changes in gas composition and flow rate. The results are summarized in Table XIII in the entries to the passes 1 to 3 rows.

The fourth pass particulate catalyst was a commercially available cesium-containing product manufactured by Monsanto Enviro-Chem Systems, Inc., known as Cs-110. The Cs-110 catalyst is in the form of ⅜-inch diameter rings averaging ⅜-inch in length. A 4.219-inch inside diameter tubular reactor was filled with a total of 915.0 cm³ of Cs-110 catalyst. The volumetric flow rate to the reactor was scaled to 131.70 SLPM with 10.0% $SO_2$ fed to pass 1 so that catalyst loadings for the 40- and 44-inch sampling points corresponded to 100 and 110 L/ST, respectively. In this 2:2 interpass absorption process, the corresponding flow to pass 3 will be 115.90 SLPM after $SO_3$ absorption in the interpass absorption tower 23 in FIG. 1 and $O_2$ consumption. The gas composition of the 115.90 SLPM gas stream to pass 3 is 2.27% $SO_2$ and 7.85% $O_2$. This gas stream was preconverted to 76.3% of the 2.27% $SO_2$ before being fed to the reactor containing the pass 4 Cs-110 catalyst. With an inlet temperature of 410° C., the % $SO_2$ conversion of the 2.27% $SO_2$, 7.85% $O_2$ gas stream reached 98.3 and 98.7% at the 40- and 44-inch reactor points, respectively, as determined by gas chromatographic analysis. The estimated catalyst loading required to give 98.5% conversion (corresponding to 99.7% overall $SO_2$ conversion) is 105.00 L/ST. The results are given in Table XIII in the row for pass 4.

sion of 63.7% conversion in 16 inches of catalyst. The results are summarized in the pass 1 row of Table XIV. Pass 2 data only assumes that pass 1 reaches 61.8% $SO_2$ conversion and obtains a total conversion of 75.3% in 18 inches of monolithic catalyst. After interpass absorption, assuming that 75.0% overall $SO_2$ conversion is obtained through pass 2, pass 3 shows that 79.6% conversion is obtained of a 3.11% $SO_2$, 6.57% $O_2$ gas stream with a flow rate of 74.31 SLPM.

For the pass 4 Cs-110 particulate catalyst, a gas flow rate to the first pass of 53.93 SLPM was assumed. This gas stream is reduced to 47.20 SLPM after $SO_3$ absorption and $O_2$ consumption after pass 2. Before introduction to the simulated fourth pass, the 47.20 SLPM gas stream was preconverted to 78.7% of the 3.14% $SO_2$ (and 6.59% $O_2$) composition. The reactor inlet temperature for the fourth pass was 389° C. and the gas stream at this point contained 0.69% $SO_2$ which was converted to 98.8% of the third pass 3.14% $SO_2$ composition (overall $SO_2$ conversion reached 99.7%) in 44 inches of catalyst corresponding to a required catalyst loading of 244.44 L/ST.

TABLE XIII

| Pass[a] | Catalyst Loading. L/ST[b] | Gas Inlet Temperature. °C. | % $SO_2$ Conversion | | | Estimated Pressure Drop.[d] Inches Water Column |
|---|---|---|---|---|---|---|
| | | | In | Out | Equilibrium[c] | |
| 1 | 3.48 | 445 | 0.0 | 65.1 | 65.2 | 16.1 |
| 2 | 3.48 | 500 | 64.9 | 80.4 | 84.5 | 12.8 |
| Interpass Absorption After Pass 2 | | | | | | |
| 3 | 3.48 | 460 | 0.0 | 80.8[e] | 90.8 | 11.0 |
| 4 | 105.00 | 410 | 76.3 | 98.5 | 98.7 | 27.6 |
| | | | Total[f] | 99.7 | 99.7 | |

[a]Integral reactor data for a 2:2 interpass absorption sulfuric acid production process with a 10% $SO_2$ and 10/9% $O_2$ gas stream fed to pass 1. Data are based on the use of Pt($ZrO_2$-$SiO_2$)/mullite monolithic catalyst in passes through 3 and a commercial cesium-containing particulate catalyst in pass 4.
[b]Abbreviations: L = liters of catalyst. ST = short tons of 100% $H_2SO_4$.
[c]Calculated adiabatic equilibrium conversion of $SO_2$.
[d]Pressure drop measured across a full integral bed of catalyst and recalculated for the bed depth at which the catalyst loading was determined for passes 1-3. For pass 4, the particulate catalyst pressure drop was calculated by using the appropriate expression for ⅜-inch ring catalyst and includes contributions from the catalyst support grid in the reactor.
[e]Conversions reported in passes 3 and 4 are calculated from the amount of $SO_2$ that remains in the gas stream after interpass absorption after pass 2 assuming 80.0% overall $SO_2$ conversion through pass 2.
[f]Total conversions in this row are based on the initial 10.0% $SO_2$ level.

TABLE XIV

| Pass[a] | Catalyst Loading. L/ST[b] | Gas Inlet Temperature. °C. | % $SO_2$ Conversion | | | Estimated Pressure Drop.[d] Inches Water Column |
|---|---|---|---|---|---|---|
| | | | In | Out | Equilibrium[c] | |
| 1 | 2.82 | 430 | 0.0 | 63.7 | 63.7 | 13.4 |
| 2 | 3.17 | 475 | 61.8 | 75.3 | 84.9 | 11.6 |
| Interpass Absorption After Pass 2 | | | | | | |
| 3 | 3.17 | 460 | 0.0 | 79.6[e] | 86.3 | 11.4 |
| 4 | 244.44 | 389 | 78.7 | 98.8 | 99.0 | 64.8 |
| | | | Total[f] | 99.7 | 99.7 | |

[a]Integral reactor data for 2:2 interpass absorption sulfuric acid production process with an 11% $SO_2$ and 9.9% $O_2$ gas stream fed to pass 1. Data are based on the use of Pt($ZrO_2$-$SiO_2$)/mullite monolithic catalyst in passes 1 through 3 and a commercial cesium-containing particulate catalyst in pass 4.
[b]Abbreviations: L = liters of catalyst. ST = short tons of 100% $H_2SO_4$.
[c]Calculated adiabatic equilibrium conversion of $SO_2$.
[d]Pressure drop observed across a full integral bed of catalyst and recalculated for the bed depth loading was determined for passed 1-3. For pass 4, the particulate catalyst pressure drop was estimated from the appropriate equation for ⅜" ring catalyst. Pressure drop for passes 1-3 is for catalyst only while the value given for pass 4 includes the catalyst support grid in addition to the catalyst.
[e]Conversions reported in passes 3 and 4 are calculated from the amount of $SO_2$ that remains in the gas stream after interpass absorption after pass 2 assuming 75.0% overall $SO_2$ conversion through pass 2.
[f]Total conversions in this row are based on the initial 11.0% $SO_2$ level.

EXAMPLE 11

The same catalysts used in Example 10 were used here except that the gas composition to pass 1 was changed to 11.0% $SO_2$ and 9.9% $O_2$. For pass 1 with an inlet temperature of 430° C., the $SO_2$ conversions measured at the 15- and 18-inch reactor points were 63.2 and 65.1%, respectively, giving an estimated conver-

EXAMPLE 12

Monolithic catalysts may be used advantageously in this process when their catalytic efficiency as gauged by the activity index exceeds 12,000 moles of $SO_2$ converted per liter of catalyst per hour. In this example, the same monolithic catalysts described in Example 10 were fed a 10.0% $SO_2$, 10.9% $O_2$ gas stream at a higher gas velocity (833 SLFM) under second pass conditions. With preconversions of the 10% $SO_2$ gas stream around 65%, the results summarized in Table XV were obtained. Activity indices are given in footnotes for the 18- and 36-inch sampling points of the monolithic catalyst. As seen from these values, at no point does the activity index exceed a value of 12,000. Thus, a lower gas velocity such as that used in examples 1 and 2 is required to give higher conversions across the catalyst bed.

Twelve monolithic catalysts closely similar to those described in Example 10 were evaluated under fourth pass conditions. Reactor inlet temperatures of 430° to 500° C. were used with gas sampling and analysis at various intervals down a 36-inch deep bed of monolithic catalyst. The results summarized in Table XVI were obtained. Overall $SO_2$ conversions through 36 inches of catalyst reach between 98 and 99%. Activity indices calculated through 18 inches of catalyst are less than 12,000 moles of $SO_2$ converted per liter of catalyst per hour. Consequently, alkali-vandium-containing particu-

TABLE XV

| Run Code, Inlet, °C.[a] Flow (SPLM), % $SO_2$, % $O_2c$[b] % $SO_2$, % $O_2$, DP (DP/foot) | Monolithic Catalyst Bed Depth, Inches | | | | | | | |
|---|---|---|---|---|---|---|---|---|
| | 0 | 6 | 12 | 15 | 18 | 21 | 24 | 27 | 36 |
| | %-$SO_2$ Conversion[d] | | | | | | | |
| MC11, 461 84.81, 10.00, 10.90 3.85, 8.12, 25.25 (8.42) | 65.24 | 69.12 | 71.81 | 73.86 | 74.82[e] | 76.01 | 77.72 | 78.31 | 82.25[f] |
| MA12, 476 84.81, 9.99, 10.91 3.92, 8.09, 26.75 (8.92) | 64.55 | 70.20 | 74.11 | 76.21 | 77.17[g] | 78.50 | 80.29 | 81.32 | 83.21[h] |
| MA13, 500 84.81, 10.00, 10.90 3.87, 8.07, 27.50 (9.17) | 65.12 | 71.73 | 76.05 | 78.10 | 79.12[i] | 80.21 | 81.50 | 82.51 | 84.40[j] |

[a]Example number followed by the temperature at the inlet to pass 2.
[b]Flow rate to first pass with the compositions of $SO_2$ and $O_2$ following.
[c]Pass 2 inlet gas analysis for % $SO_2$ and % $O_2$ (with the $SO_3$ removed) and the pressure drop across the 0- and 36-inch bed depths. In parentheses is the pressure drop in inches water column per foot of catalyst.
[d]Conversions of $SO_2$ fed to the second pass calculated on the basis of the preconverted value shown at the 0-inch bed depth.
[e]Activity index = 8173 moles $SO_2$ converted/liter of catalyst-hour.
[f]Activity index = 7312 moles $SO_2$ converted/liter of catalyst-hour.
[g]Activity index = 10740 moles $SO_2$ converted/liter of catalyst-hour.
[h]Activity index = 9861 moles $SO_2$ converted/liter of catalyst-hour.
[i]Activity index = 11941 moles $SO_2$ converted/liter of catalyst-hour.
[j]Activity index = 11422 moles $SO_2$ converted/liter of catalyst-hour.

EXAMPLE 13

High catalytic efficiencies are difficult to achieve with monolithic catalysts in the final pass of a catalytic $SO_2$ conversion unit. This example shows that neither overall $SO_2$ conversions of at least 99.7% nor activity indices above 12,000 moles of $SO_2$ converted per liter of catalyst per hour are achieved with monolithic catalysts under fourth pass conditions (10.0% $SO_2$ fed to the first pass) in a 2:2 IPA process.

late catalysts such as Cs-110 described in Example 10 are favored for use in pass 4.

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

TABLE XVI

| Run Code, Inlet, °C.[a] Flow (SPLM, SLFM)[c] (% $SO_2$, % $O_2$, % $N_2$, % $SO_3$, DP)[d] (% $SO_2$, % $O_2$)[e] | Monolithic Catalyst Bed Depth, Inches | | | | | | | | |
|---|---|---|---|---|---|---|---|---|---|
| | 0 | 3 | 6 | 9 | 12 | 15 | 18 | 21 | 36 |
| | %-$SO_2$ Conversion[d] (Total %-$SO_2$ Conversion[g]) | | | | | | | | |
| MA23, 430 72, 35, 547 (0.50, 7.11, 90.61, 1.78, 13.7) (2.25, 7.93) | 77.95 (96.24 | 79.10 96.44 | 81.24 96.81 | 82.51 97.02 | 83.42 97.18 | 84.31 97.33 | 86.41 97.69 6929[h] | 85.82 97.59 | 90.50 98.38) |
| MA25, 445 72.40, 548 (0.66, 7.19, 90.54, 1.62, 14.3) (2.26, 7.94) | 71.03 (94.95 | 74.87 95.62 | 77.73 96.12 | 80.77 96.65 | 81.88 96.84 | 84.29 97.26 | 83.29 97.09 10004 | 85.24 97.43 | 90.19 98.29) |
| MA26, 460 72.35, 547 (0.53, 6.91, 90.79, 1.77, 14.3) (2.26, 7.94) | 76.77 (96.04 | 79.91 96.58 | 82.80 97.07 | 84.96 97.44 | 86.51 97.07 | 87.41 97.86 | 88.42 98.03 9535 | 88.26 98.00 | 92.01 98.64) |
| MA27, 475 72.33, 547 (0.49, 6.87, 90.82, 1.82, 15.1) (2.27, 7.71) | 78.62 (96.39 | 81.94 96.95 | 84.09 97.32 | 86.67 97.75 | 87.87 97.95 | 89.18 98.17 | 89.98 98.31 9306 | 89.99 98.31 | 93.51 98.91) |
| MA28, 500 72.34, 547 (0.50, 6.87, 90.81, 1.81, 15.4) | 78.34 (96.33 | 80.84 96.75 | 82.84 97.09 | 84.21 97.32 | 85.73 97.58 | 87.30 97.85 | 88.31 98.02 8167 | 88.82 98.11 | 91.65 98.58) |

TABLE XVI-continued

| Run Code, Inlet, °C.[a] | Monolithic Catalyst Bed Depth, Inches | | | | | | | |
|---|---|---|---|---|---|---|---|---|
| Flow (SPLM, SLFM)[c] | 0 | 3 | 6 | 9 | 12 | 15 | 18 | 21 | 36 |
| (% $SO_2$, % $O_2$, % $N_2$, % $SO_3$, DP)[d] | | | | | %-$SO_2$ Conversion[d] | | | |
| (% $SO_2$, % $O_2$)[e] | | | | | (Total %-$SO_2$ Conversion[g]) | | | |
| (2.29, 7.71) | | | | | | | | |

[a]Run code followed by the inlet temperature to the reactor.
[b]Flow rate to first pass is 82.63 SLPM (8.26 SLPM $SO_2$, 9.09 SLPM $O_2$, 65.28 SLPM $N_2$, fed as 43.28 SLPM air and 31.09 SLPM $N_2$) with 10.00% $SO_2$ and 10.90% $O_2$. Total flows were adjusted for values around 83% $SO_2$ conversion through the second pass.
[c]Total gas flow rate (SLPM) and velocity (SLFM) to reactor after $O_2$ consumption across the preconverter and $SO_2$ and $N_2$ addition at the preheater to the reactor.
[d]Feed gas analysis for $SO_2$, $O_2$, $N_2$, $SO_3$ (based on $SO_2$ conversion), and measured pressure drop in W.C. across the 36" catalyst bed depth.
[e]Compositions of $SO_2$ and $O_2$ in % to pass 3 after interpass $SO_3$ absorption.
[f]Conversion of $SO_2$ based on the amount fed to the first pass.
[g]Total conversion of $SO_2$ based on the amount fed to the first pass.
[h]Activity index value given here and at corresponding succeeding points in the table.

What is claimed is:

1. A process for the manufacture of sulfuric acid comprising the steps of:
    passing a gas stream comprising sulfur dioxide and oxygen through a plurality of preliminary contacting stages, said gas being contacted in each said preliminary stage with a monolithic catalyst comprising a platinum active phase, thereby converting a substantial fraction of the sulfur dioxide in said gas stream to sulfur trioxide;
    contacting the gas stream leaving one of said plurality of preliminary contacting stages with sulfuric acid in an absorption zone to remove sulfur trioxide from said stream by absorption in said sulfuric acid; and
    after said gas stream has passed through said plurality of preliminary stages and said absorption zone, passing said gas stream through a final contacting stage in which the gas is contacted with a particulate catalyst comprising vanadium and cesium, thereby substantially converting residual sulfur dioxide in the gas to sulfur trioxide.

2. A process as set forth in claim 1 wherein the monolithic catalyst with which said gas stream is contacted in each of said preliminary stages comprises a foraminous monolithic ceramic support, said support having at the foraminal wall surfaces thereof a high surface area silica substrate for an active catalyst phase and, on said substrate, an active phase comprising platinum.

3. A process as set forth in claim 2 wherein said catalyst has a combination of a platinum active phase and a promoter on said substrate, said promoter being selected from the group consisting of a compound of zirconium, a compound of titanium or a compound of hafnium.

4. A process as set forth in claim 3 wherein said substrate comprises a silica washcoat on the foraminal wall surfaces of said support and bound to said walls by a silica sol that is dried and calcined, and a platinum active phase on said washcoat.

5. A process as set forth in claim 1 wherein the acid stream entering said absorption zone has a temperature of at least about 120° C. and strength of at least about 98.5%, the acid discharged from said absorption zone has a temperature of at least 140° C. and a strength of at least about 99%, the process further comprising: recovering the heat of absorption from said discharge acid in useful form by transfer of heat to another fluid in a heat exchanger, and thereby heating said another fluid to a temperature greater than 120° C.

6. A process as set forth in claim 5 wherein said another fluid is heated to a temperature of at least about 140° C.

7. A process as set forth in claim 6 wherein said another fluid as introduced into said heat exchanger comprises water, and steam is generated in said heat exchanger at a pressure of at least about 55 psig.

8. A process as set forth in claim 1 consisting of passing the gas stream through three preliminary contacting stages and a final contacting stage.

9. A process as set forth in claim 8 wherein the monolithic catalyst with which said gas stream is contacted in each of the second and third preliminary contacting stages comprises a foraminous monolithic ceramic support, said support having at the foraminal wall surfaces thereof a high surface area silica substrate for an active phase and, on said substrate, an active phase comprising platinum.

10. A process as set forth in claim 9 wherein the particulate catalyst comprising said final contacting stage is contained in a vessel separate from any vessel containing any of said preliminary stages.

11. A process as set forth in claim 9 wherein the substrate for the active phase of each of the second and third preliminary stages comprises a silica washcoat on the foraminal wall surfaces of said support and bound to said walls by a silica sol that is dried and calcined, the catalyst of said stage having a platinum active phase on said washcoat.

12. A process as set forth in claim 11 wherein the monolithic catalyst with which the gas stream is contacted in the first preliminary contacting stage comprises a foraminous monolithic ceramic support, said support having at the foraminal wall surfaces thereof a high surface area silica substrate for an active catalyst phase and, on said substrate, a combination of a platinum active phase and a promoter on said substrate, said promoter being selected from the group consisting of a compound of zirconium, a compound of titanium or a compound of hafnium.

13. A process as set forth in claim 9 wherein the monolithic catalyst with which said gas stream is contacted in each of the second and third preliminary stages has a combination of a platinum active phase and a promoter on the silica substrate for the active phase of said stage, said promoter being selected from the group consisting of a compound of zirconium, a compound of titanium or a compound of hafnium.

14. A process as set forth in claim 13 wherein the $SO_2$ content of the gas entering the first of said preliminary stages is between about 7% and about 13% by volume.

15. A process as set forth in claim 14 wherein the total catalyst loading for the three preliminary stages is not greater than about 15 liter days per short ton of sulfuric acid equivalent to the sulfur dioxide converted to sulfur trioxide in said preliminary stages.

16. A process as set forth in claim 14 wherein the activity index of the catalyst in each of the three preliminary stages is at least about 12,000 moles $SO_2$ converted per hour per liter of catalyst as defined by the relationship:

$$\text{Activity Index} = \frac{\text{Moles } SO_2 \text{ Converted}}{(\text{Liter catalyst-hour}) (X_d) (X_o)^{0.5}}$$

where $X_d$ is the mole fraction of $SO_2$ contained in the gas stream fed to the catalyst stage and $X_o$ is the mole fraction of $O_2$ in the gas fed to the catalyst stage.

17. A process as set forth in claim 14 wherein the mole ratio of Cs to V in said particulate catalyst is at least about 0.75.

18. A process as set forth in claim 17 wherein each of said contacting stages is substantially adiabatic, and at least about 99.7% of the $SO_2$ contained in the gas entering said first preliminary stage is converted to $SO_3$ during passage through said preliminary stages and final stage.

19. A process as set forth in claim 17 wherein each of said contacting stage is substantially adiabatic, and the gas exiting said final contacting stage has an $SO_2$ content of not greater than about 350 ppm.

20. A process as set forth in claim 14 wherein the first preliminary stage is operated substantially adiabatically, and the temperature of the gas stream entering the first preliminary stage is between about 420° C. and about 450° C.

21. A process as set forth in claim 20 wherein the second and third preliminary stages are operated substantially adiabatically, the temperature of the gas stream entering the second preliminary stage is between about 460° C. and about 500° C., and the temperature of the gas stream entering the third preliminary stage is between about 450° C. and about 475° C.

22. A process as set forth in claim 14 wherein said final contacting stage is operated substantially adiabatically, and the temperature of the gas stream entering said final stage is between about 360° C. and about 415° C.

23. A process as set forth in claim 14 wherein the velocity of the gas stream entering said first preliminary stage is at least about 625 standard linear ft/min.

24. A process as set forth in claim 14 wherein the monolithic catalyst in each of the three preliminary stages has a flow resistance characteristic such that the pressure drop of a gas containing sulfur dioxide, oxygen, and nitrogen flowing at a velocity of about 600 standard linear ft/min is not greater than about 12" water per lineal foot in the direction of flow.

25. A process as set forth in claim 24 wherein said foraminous support of said monolithic catalyst in each of the preliminary stages needed to distinguish support referred to in claim 58 comprises between about 100 and about 400 pores per square inch of a cross section taken transverse to the direction of gas flow through the catalyst.

26. A process as set forth in claim 25 wherein the foraminous void fraction of said monolithic catalyst in each of the preliminary stages is between about 0.25 and about 0.75.

* * * * *